United States Patent [19]

Hammer et al.

[11] E Re. 30,754

[45] Reissued Sep. 29, 1981

[54] PROCESS FOR THE PREPARATION OF GRAFT COPOLYMERS

[75] Inventors: Clarence F. Hammer, Wilmington, Del.; Harold K. Sinclair, Louisville, Ky.

[73] Assignee: E. I. Du Pont de Nemours and Company, Wilmington, Del.

[21] Appl. No.: 969,934

[22] Filed: Dec. 15, 1978

Related U.S. Patent Documents

Reissue of:

[64] Patent No.: 3,972,961
Issued: Aug. 3, 1976
Appl. No.: 523,468
Filed: Nov. 13, 1974

[51] Int. Cl.[3] ..... C08L 51/08

[52] U.S. Cl. ..... 525/379; 260/27 R; 525/385

[58] Field of Search ..... 525/64, 66, 69, 379, 525/385

[56] References Cited

U.S. PATENT DOCUMENTS

| | | | |
|---|---|---|---|
| 2,524,045 | 10/1950 | Flory | 260/857 G |
| 3,136,738 | 6/1964 | Hedrick et al. | 260/857 G |
| 3,539,664 | 11/1970 | Kray et al. | 260/857 G |
| 3,644,571 | 2/1972 | Anderson et al. | 260/857 G |
| 3,676,400 | 7/1972 | Kohan et al. | 260/857 L |

FOREIGN PATENT DOCUMENTS

| | | |
|---|---|---|
| 1074948 | 7/1967 | United Kingdom . |
| 1368628 | 10/1974 | United Kingdom . |

*Primary Examiner*—Harold D. Anderson

[57] ABSTRACT

Process for the preparation of thermoplastic graft copolymers which comprises heating for about 15 seconds to 60 minutes, with mixing, a trunk copolymer of at least two monomers, at least one of said monomers providing amine-reactive sites taken from the group consisting of the anhydride group, e.g., maleic anhydride; a vicinal pair of carboxylic groups and a carboxylic acid adjacent to an alkoxycarbonyl group, wherein the alkoxy group contains up to 20 carbon atoms, and at least one of said monomers containing no amine-reactive sites, and at least one side chain polymer having per chain one active amine site taken from the group consisting of primary and secondary amines, the remainder of said side chain polymer being substantially unreactive with the reactive sites, e.g., amino-substituted polycaprolactam, polylaurolactam, polyethylene oxide, etc., of the trunk copolymer. The process provides control of the type and length of the side chain polymer grafted onto the trunk copolymer. Plastic graft copolymers are included, specifically those containing one or more side chain polymer types with the priviso that when only one type side chain polymer is present the side chain polymer contains only one nitrogen atom, said atom being found in the active amine site.

56 Claims, No Drawings

PROCESS FOR THE PREPARATION OF GRAFT COPOLYMERS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a process for the preparation of thermoplastic graft copolymers and particularly a process wherein the graft copolymers are formed by reacting a trunk copolymer having reactive sites with a side chain polymer having an amine group reactive with the sites. This invention also relates to graft copolymers.

2. Description of the Prior Art

Many grafting processes are described in the prior art. Generally, the term "to graft onto" relates to a two step process whereby a polymerizable monomer is first blended with a polymer and then the monomer is polymerized, e.g., by free radical or ionic graft polymerization, in the presence of the polymer. In the conventional process this term to graft onto means a process in which the side chain polymer is grown in the presence of the dead or preformed polymer. In the conventional grafting process, electron irradiation, peroxide treatment, etc. are used to activate sites on the polymer chain for subsequent polymerization of the monomer and attachment to the sites. Typical of prior art relating such conventional grafting processes include U.S. Pat. Nos. 3,136,738; 3,388,186; 3,465,059; 3,676,190 and Belgian Patent Nos. 780,964; 780,965 and 780,966. U.S. Pat. No. 3,136,738 describes the grafting onto a vinyl backbone copolymer in the presence of catalysts a caprolactam. The polycaprolactam is grown as a side chain onto the backbone polymer at the active sites. U.S. Pat. Nos. 3,388,186 and 3,465,059 describe graft copolymers having backbone chains containing recurring ethylenic units and side chains containing carboxy-terminated polyamide groups, the graft copolymers being formed by hydrolytically polymerizing in the melt a polyamide precursor such as caprolactam or laurolactam in the presence of a preformed ethylene/acrylic acid, salt or ester copolymer. U.S. Pat. No. 3,676,190 discloses various type backbone polymers, preferably vinyl-type and vinylidene-type polymers and copolymers subjected to the action of ozone and onto the polymer is grafted at least one polymerizable ethylenically unsaturated monomer. The Belgian patents teach that random copolymers of ethylene and minor amounts of maleic anhydride can be reacted with alcohols and amines; for example, a polyethanol amine. These Belgian patents, however, describe bridged or crosslinked polymers where the bridging agents contain two or more reactive sites.

U.S. Pat. No. 3,676,400 relates to blends of high-amine-end polyamides with acidic olefin copolymers. The olefin copolymers can be derived from ethylene and monoethylenically $\alpha,\beta$-unsaturated monocarboxylic or dicarboxylic acids such as acrylic, methacrylic, maleic, fumaric acids, etc. Each polyamide molecule has on the average more than one active amine site which can react with the reactive sites of the trunk copolymer if such reactive sites are present. The reaction product contains crosslinks which are not desired in the graft copolymers of the present invention.

None of the prior art suggests grafting onto a trunk copolymer a preformed side chain polymer having one amine group active with sites on the trunk copolymer to produce a thermoplastic or soluble polymer.

The value of the present invention can be more fully understood when graft copolymers having two different types of side chains are prepared. If conventional prior art techniques are used, either copolymer side chains are obtained from mixed comonomers or when the monomers are used to form a graft copolymer in two steps either the active sites on the trunk copolymer are blocked by the first monomer or many side chains are formed containing grafts of the second monomer on the chains previously formed from the first monomer. In contrast, by the process described below, two or more types of side chain polymers may be grafted onto a trunk copolymer simply by mixing the preformed polymer side chains at the time the grafting reaction occurs.

SUMMARY OF THE INVENTION

According to one aspect of this invention, there is provided a process for the preparation of thermoplastic graft copolymers which comprises heating for about 15 seconds to 60 minutes, with mixing, (1) a trunk copolymer of at least two monomers, at least one of said monomers providing amine-reactive sites taken from the group consisting of an anhydride group, a vicinal pair of carboxylic groups and a carboxylic group adjacent to an alkoxycarbonyl group, wherein the alkoxy group contains up to 20 carbon atoms, and at least one of said monomers containing no amine-reactive sites, and (2) at least one side chain polymer having per chain one active amine site taken from the group consisting of primary and secondary amines, the remainder of said side chain polymer being substantially unreactive with the reactive sites of the trunk copolymer. The graft copolymer produced is thermoplastic and is not crosslinked.

According to another aspect of this invention, there is provided a thermoplastic graft copolymer consisting essentially of a trunk copolymer derived from at least two monomers, at least one of said monomers providing amine-reactive sites taken from the group consisting of an anhydride group, a vicinal pair of carboxylic groups and a carboxylic group adjacent to an alkoxycarbonyl group, wherein the alkoxy group contains up to 20 carbon atoms, and at least one of said monomers containing no amine-reactive sites, and at least one type side chain polymer linked to said reactive sites through amide or imide linkages, said side chain polymer being derived from a short chain polymer having from about 5 to 50 repeat units and containing one active amine site selected from the group consisting of primary and secondary amines, the remainder of the side chain polymer being substantially unreactive with the amine-reactive sites of the trunk copolymer, with the proviso that when only one type of side chain polymer is present the side chain polymer contains only one nitrogen atom, said atom being found in the active amine site.

The term "trunk copolymer" as employed herein includes the polymerization product of at least one polymerizable monomer which has no amine-active sites, e.g., ethylene, vinyl monomers such as vinyl acetate, styrene, vinyl chloride, etc., and at least one polymerizable monomer which provides amine-active sites, e.g., maleic anhydride. Included in the term is a copolymer having grafted thereon a monomer which provides the amine-active sites, e.g., ethylene/α-monoolefin/1,4-hexadiene/maleic anhydride copolymer.

The term "side chain polymer" as employed herein includes the polymerization product of a polymerizable monomer which contains one active amine site per chain, said amine site being subsequently attached to the amine-active sites of the trunk copolymer. The active amine site is generally on one end of the side chain polymer while the other ends or substituent groups of the side chain polymer are substantially unreactive with the reactive sites of the trunk copolymer. The extent to which there may be more than one reactive site per chain is determined by the degree of cross-linking obtained in a specific case; i.e., the amount of additional reactive sites per chain, over one per chain, must be so small that the graft copolymer is not substantially cross-linked.

By the process of the invention at least one side chain polymer type can be attached to the amine-reactive sites of the trunk copolymer. Two or more different side chain polymer types, however, can be present in the graft copolymer. Different side chain polymer types refers to at least two side chain polymers, e.g., polycaprolactam, polylaurolactam, polyethylene oxide, polypropylene oxide, and other side chain polymers described below which for purposes of this invention are different chemical structures. Different side chain polymer types does not refer to a mere difference in molecular weight of a particular side chain polymer type such as polycaprolactam, etc.

DETAILED DESCRIPTION OF THE INVENTION

Thermoplastic graft copolymers are prepared in accordance with the process of this invention by reacting a trunk copolymer having amine-reactive sites with at least one side chain polymer having about one active amine site of primary or secondary amines; the other groups or ends of the side chain polymer are substantially unreactive with the reactive sites on the trunk copolymer. In the final graft copolymer the trunk copolymer content ranges in an amount of about 25 to 95 percent by weight and the side chain polymer content ranges from about 5 to 75 percent by weight. The trunk copolymers contain, on a number average, about 300 to 50,000, preferably 500 to 20,000, chain atoms, and a number of amine reactive sites occurring, on the average, at a frequency of about one to 200 per 1000 chain atoms of the trunk copolymer. On the average there will be at least one active site per trunk copolymer chain. The side chain polymer will, in general, be shorter than the trunk copolymer, ranging in length from about 25 to 1,000 chain atoms, preferably about 30 to 300 chain atoms.

The trunk copolymers must be sufficiently stable to withstand heating during the grafting of the side chain polymer. They should also be free from hydroxyl, primary amino, and secondary amino groups which can react with the amine reactive graft sites to form thermostable crosslinks causing a loss of the desired thermoplasticity.

The amine-reactive sites on the trunk copolymers are provided by monomers which are either copolymerized during the preparation of the trunk copolymer or are grafted onto a previously existing polymer.

Copolymerization of a monomer providing the amine reactive site with other monomers is possible when the other monomers are polymerizable by conventional free radical catalysis, α-olefins (such as ethylene, propylene, 1-butene; alkyl acrylates and methacrylates (such as methyl, ethyl and butyl); conjugated dienes (such as 1,3butadiene, isoprene); other dienes (such as 1,4-hexadiene); styrene, methyl vinyl ether, methyl vinyl sulfide, acrylonitrile, vinyl acetate, vinyl chloride, and the like are well known examples of suitable comonomers.

Free radical polymerizable monomers which can be incorporated into the trunk copolymer to provide the amine reactive sites, have the formulae

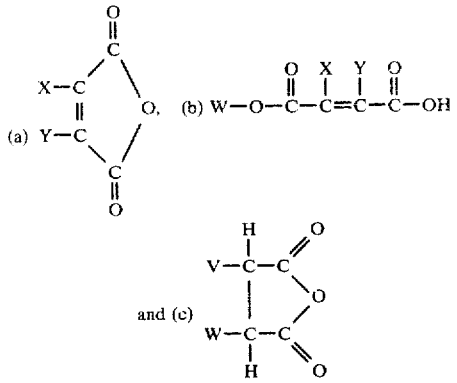

where X and Y are independently selected from H, Cl, $C_1$–$C_8$ alkyl and phenyl with the proviso that one of X and Y must be H and W is H, $C_1$–$C_{10}$ alkyl, phenyl, naphthyl or substituted phenyl or naphthyl where the substituents are $C_1$–$C_{10}$ alkyl, halogen, and $C_1$–$C_{10}$ alkoxy groups, and V is a radical containing $C_2$–$C_{12}$ alkenyl and having a copolymerizable double bond.

Compounds representative of formula (a) include maleic anhydride and citraconic anhydride. Compounds representative of formula (b) include maleic acid, citraconic acid, fumaric acid, mesaconic acid, and monoesters of maleic and fumaric acid, including the methyl, ethyl, isopropyl, propyl butyl, tert-butyl, amyl, isoamyl, hexyl, octyl, decyl, phenyl, 1-naphthyl, 2-naphthyl, 2-methylphenyl, 2-ethylphenyl, 2,5-dimethylphenyl, 4-isopropylphenyl, 4-butylphenyl, 3,5-dimethyl-3-propylphenyl, 3-decylphenyl, 4-tetradecylphenyl, 4-hexadecylphenyl, 4-octadecylphenyl, 2-chlorophenyl, 4-methoxyphenyl, 2-chloro-1-naphthyl, 4-chloro-1-naphthyl, 6-chloro-1-naphthyl, 7,8-dichloro-1-naphthyl, 4-bromo-1-naphthyl, 7-chloro-2-naphthyl, 4-methyl-1-naphthyl, and 1-propyl-2-naphthyl. Compounds representative of formula (c) include alkenyl succinic anhydrides, e.g., 3-ethenyl succinic anhydride, 3-ethenyl, 4-methyl succinic anhydride, 3-allyl succinic anhydride, 3-isopropenyl succinic anhydride, 3-(2-butenyl) succinic anhydride, 3(4-pentenyl) succinic anhydride, etc. Also useful are itaconic acid, its anhydride and monoesters.

The copolymerization reaction to form an ethylene containing trunk copolymer can be carried out most advantageously in a pressure reactor at a temperature of 90°–250° C. and a pressure of 1600–2200 atm. The polymerization temperature is preferably maintained at about 145° C. and the pressure at 1800–2000 atm. Usually, the polymerization process is continuous, the monomer, optionally a solvent such as benzene, and the initiator being introduced at a controlled rate, and the reaction product being continuously removed. A stirred autoclave such as described in U.S. Pat. No. 2,897,183 to Christl et al. can be used. Suitable free-radical polymerization initiators include organic peroxides, for example, lauryl peroxide, and di-t-butyl peroxide; peresters, such as t-butyl peracetate and t-butyl peroxypivalate; and azo compounds, such as azobisisobutyronitrile.

A representative trunk copolymer is a random copolymer having a melt index of about 0.3 to 100 grams/10 min. and consisting essentially of polymerized ethylene, an alkyl acrylate selected from methyl and ethyl acrylate, and from 0.0025–0.077 mole/100 grams of polymer of a monoalkyl ester of a 1,4-butene dioic acid in which the alkyl group of the ester has 1 to 6 carbon atoms, each 100 grams of copolymer having from about 0.64–0.80 mole of ($—CO_2—$) units. Copolymers of ethylene, methyl acrylate, and ethyl hydrogen maleate corresponding to the above have compositions such as the following:

| Mole % | | |
|---|---|---|
| Ethylene | Methyl Acrylate | Ethyl Hydrogen Maleate |
| 71.2 | 28.7 | 0.1 |
| 57.8 | 42.1 | 0.1 |
| 74.4 | 22.0 | 3.6 |
| 61.4 | 34.4 | 4.2 |

Another representative trunk copolymer is an alternating copolymer having repeating units consisting essentially of —A—B— where B represents ethylene units and A represents units selected from at least one $C_1$–$C_8$ alkyl acrylate and an acrylic cure-site monomer having the formulae (a) or (b) described above. The copolymerization is done in solution at −10° C. to about 200° C. in the presence of a free radical initiator and $BF_3$ at pressures sufficient to keep the $BF_3$ complexed with the alkyl acrylate (generally 0.703 to 703 kg./sq. cm. gauge). See Logothetis U.S. Ser. No. 233,741, filed Mar. 10, 1972.

An important class of copolymers which cannot be made with free radical catalysts includes EPDM rubber. These copolymers are prepared by using the well known Ziegler or coordination catalysts which are combinations of transition metal compounds (usually vanadium or titanium compounds such as $VOCl_3$, $VCl_4$, vanadium trisacetylacetonate, and titanium tetrachloride) and Group I–III organometallic reducing agents (such as alkylaluminum chlorides and bromides, lithium aluminum tetraalkyls, aluminum trialkyls). EPDM rubber is made by copolymerizing ethylene and propylene with at least one non-conjugated hydrocarbon diene, e.g., 1,4-hexadiene, 5-propenyl-2-norbornene, 5-ethylidene-2-norbornene, 5-methylene-2-norbornene, dicyclopentadiene as described in Gresham and Hunt U.S. Patent 2,933,480; Tarney U.S. Pat. No. 3,000,866; Gladding U.S. Pat. No. 3,093,620; Gladding and Robinson U.S. Pat. No. 3,093,621; Adamek, Dudley and Woodhams U.S. Pat. No. 3,211,709; and Nyce U.S. Pat. No. 3,151,173. One of the double bonds is usually substantially less reactive than the other; incorporation of the diene then leads to a monomer unit having the less reactive double bond in the side chain. After the copolymer has been formed, single monomer units such as those described above in formulae (a) and (b) which have amine reactive sites can be grafted to the EPDM by thermal addition to the unsaturated side chains. A typical trunk copolymer can be represented by the following formula which illustrates the case of the addition of a single maleic anhydride group on an ethylene/α-monoolefin/1,4-hexadiene copolymer

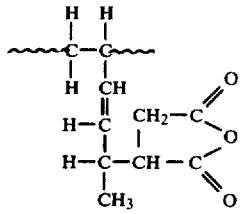

wherein the wavy lines represent the polymer chain. This structure can be achieved by reacting maleic anhydride with the ethylene/α-monoolefin/1,4-hexadiene copolymer. The hydrocarbon copolymer may also include small amounts of units of a direactive non-conjugated diene as in the ethylene/propylene/1,4-hexadiene/2,5-norbornadiene copolymer, as well as other copolymers described in Campbell and Thurn U.S. Pat. No. 3,819,591.

Propylene is normally selected as the α-monoolefin in preparing side chain unsaturated elastomeric ethylene copolymers because of its availability and low cost. Higher α-monoolefins ($C_4$–$C_{18}$) are useful, also; 1-butene, 1-hexene, and 1-dodecene are examples. The α-monoolefins may be omitted completely, making an ethylene/hexadiene copolymer.

The graft addition of amine reactive monomers described above, e.g., maleic anhydride and ethyl hydrogen maleate, is conveniently accomplished by heating a blend of the copolymer and amine reactive monomer within a range of about 225°–400° C., above the melting point of the trunk copolymer and side chain polymer. A process of this type is described in detail in Caywood U.S. Pat. No. 3,884,882. Internal mixture or extruders are suitable. Exposure to maleic anhydride vapor should be minimized on account of its toxicity and potential for causing severe eye damage. Unreacted maleic anhydride can be removed from the graft product by aqueous extraction or by dissolution in hexane, a nonsolvent for maleic anhydride.

In preparing the trunk copolymer, for example, ethylene and ethylenic monomers having carboxylic functionality may be copolymerized, the comonomers being randomly interconnected through C—C linkages and comprising 70–99 percent by weight of ethylene. The carboxylic functionality is taken from the group consisting of the anhydride group, a vicinal pair of carboxylic groups and a carboxylic group adjacent to an alkoxycarbonyl group, wherein the alkoxy group has up to 20 carbon atoms. Examples of specific trunk copolymers are: ethylene/maleic anhydride, ethylene/(lower monoalkyl $C_1$ to $C_4$) maleate, ethylene/(lower monoalkyl $C_1$ to $C_4$) fumarate, ethylene/(lower monoalkyl $C_1$ to $C_4$) itaconate, ethyl acrylate/maleic anhydride, ethyl acrylate/monoethyl fumarate, styrene/maleic anhydride, styrene/monoalkyl ($C_1$ to $C_4$) maleate, styrene/monoalkyl ($C_1$ to $C_4$) itaconate, alkyl vinyl ether/maleic anhydride, vinyl chloride/maleic anhydride, and others containing three and four components, e.g., alternating ethylene/ethyl acrylate/allyl acrylate/maleic anhydride, alternating ethylene/ethyl acrylate/ethylene diacrylate/maleic anhydride, ethylene/maleic anhydride/3-methyl butene or vinyl acetate, ethylene/vinyl monomer/monoethyl maleate or monoethyl fumarate, ethyl acrylate/butyl acrylate/monoethyl fumarate, vinyl chloride/vinyl acetate/maleic anhydride, etc.

The side chain polymers linked to the reactive sites can be of the same kind or of different types of polymers set forth below. The side chain polymers are short chains having about 5 to 50 repeat units. At least 80 percent of the side chain polymers have one reactive end group of primary or secondary amines, preferably primary amine, and the other ends or substituent groups are substantially unreactive, e.g., alkyl containing 1 to 18 carbon atoms, aminde, aryl, carboxylic acid, etc. Examples of side chain polymers that can be linked to the reactive sites include: (1) polymers of lactams containing 3 to 12 cabon atoms, e.g., polycaprolactam, polylaurolactam, other lactams such as those made from $\beta$-alanine (nylon 3) from $\gamma$-aminobutyric acid (nylon 4), $\omega$-aminovaleric acid (nylon 5) and similar polyamides from $\omega$-amino acids containing 7, 8, 9, 10 or 11 carbon atoms (anthranilic acid is also useful); (2) copolymers of said lactam containing 3 to 12 carbon atoms, e.g., copolymers of caprolactam and laurolactam as well as the other lactams described above; (3) polymers of organic oxides containing 2 to 16 carbon atoms, e.g., ethylene oxide, propylene oxide, 1,2-butylene epoxide, 1,4-butylene epoxide, styrene oxide, 1,2-diphenyl ethylene oxide, dioxolane; (4) copolymers of said organic oxides containing 2 to 16 carbon atoms; (5) polymers of styrene; (6) polymers of substituted styrenes (1 to 4 carbon atoms); (7) copolymers of styrene and substituted styrenes; (8) polymers of acrylates; (9) polymers of methacrylates; (10) copolymers of acrylates and methacrylates; and (11) polymers of lactones.

The graft copolymers of this invention, for example, may be represented as $V_kW_lX_mY_nZ_p$ where V represents the dominant monomer, W the modifying monomer for the trunk copolymer, X the monomer containing the reactive sites, Y the repeat unit used in one type of side chain, and Z the repeat unit used in another type of side chain.

The graft copolymer can be produced by a three step process in which (a) $V_kW_lX_m$ is produced, (b) $Y_n$ and/or $Z_p$ is produced, and (c) the product $V_kW_lX_mY_n$ or $V_kW_lX_mY_nZ_p$ is produced by a simple molten phase or solution reaction.

When the value of subscript k is greater than the value of subscript 1, the monomer V is viewed as the dominant monomer. The value of subscript 1, in fact, may be zero. W is considered to be sufficiently general to include one or more modifying monomers. X is the monomer which provides the reactive site. Y represents the monomer from which the side chain polymer is produced and this may be a copolymer as well as a homopolymer. $Y_n$ contains one primary or secondary amine group, generally on one end. At least 80 percent of the molecules, $Y_n$, contain one amine group. Substantially none of the molecules $Y_n$ contain more than one amine group, or other groups which are reactive with the reactive site associated with the monomer, X, since the melt reaction would then produce a cross-linked product.

[In an important embodiment the process can be used to prepare graft copolymers represented by the formula: $V_kX_mZ_p$, wherein V represents ethylene, ethyl acrylate, styrene, etc.; X represents a functional ethylenic compound; e.g., maleic anhydride, mono(lower alkyl $C_1$ to $C_4$) maleate, fumarate and itaconate; $V_k$ and $X_m$ are randomly interconnected through C—C linkages; Z represents a polyamide side chain of the formula:]

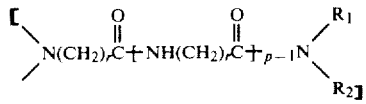

[$Z_p$ is attached to X through an amide or imide group linkage; $R_1$ is hydrogen or $C_1$ to $C_{18}$ alkyl; $R_2$ is $C_1$ to $C_{18}$ alkyl, aralkyl, e.g., benzyl; aryl, e.g., phenyl; or $R_1$ and $R_2$ taken together constitute a 5 or 6-membered ring; k, m, p and r are integers (though analytical data may give average fractional values for k, m, and p); the ratio of k:m is in the range of 4:1 to 200:1 and in such additional relationship that the weight ratio of $V_k$:$X_m$ is in the range of 99:1 to 70:30; r is 3 to 11, preferably 5 or 11; and p is in the range of about 4 to about 29, preferably 5 to 9. The value of r defines the type of polyamide used.]

[The subscripts k and m in the above formula represent the number of respective ethylenic, acrylic or styrene monomer units and the number of monomer units which provide the active site, e.g., maleic anhydride, in the trunk copolymer. It is apparent that no more than one polyamide segment is attached to any X-site, but not every X-site need have a Y side chain.]

[When a polyamide is used as the side chain polymer the amount by weight of the polyamide component depends on several factors, e.g., frequency of attachment of side chains, number of units per side chain and molecular weight per unit. The proportion of polycaprolactam is generally in the range of 20 to 75 percent by weight of the graft copolymer, preferably 33 to 50 percent by weight; the proportion of polylaurolactam is generally in the range of 15 to 60 percent by weight, preferably 15 to 35 percent by weight.]

[Preferably the preformed side chain polyamides are derived from oligomeric polycaprolactam or polylaurolactam, or copolymers of these lactam. These oligomeric polylactams have one reactive primary amino end group and one nonreactive end group. They are prepared by reacting the lactam with an amine, corresponding to $R_1NHR_2$, where $R_1$ and $R_2$ are H, $C_1$ to $C_{18}$ alkyl, benzyl and $C_5$ to $C_6$ cycloalkyl with the proviso that $R_1$ and $R_2$ are not both H and $R_1$ and $R_2$, when taken together, constitute a ring such as in $C_4$ to $C_5$ alkylene or a ring containing a heteroatom as in 3-oxapentylene, in an amount designated to produce an oligomer having a predominant average degree of polymerization in the range of about 5 to 60, preferably 6 to 10, more preferably 6 to 8. This reaction, carried out at a temperature in the range from about 250° C. to about 300° C. can be represented on a theoretically quantitative basis as follows:]

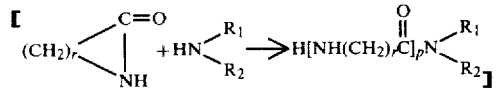

[$R_1$, $R_2$, r and p are as defined above.]

[Optionally, a small amount of water can be added as a reaction promoter, in which case a free carboxylic acid end group, in small porportion corresponding to the amount of water, is produced alternatively to the amido end group. In practice the reaction may not be quantitative since the product may contain unreacted lactam and amine, and a small amount of a mixture of oligomers having degrees of polymerization below 5. Since the unreacted starting materials and the lower molecular weight oligomers are readily soluble, they may be removed by solvent extraction and the remaining oligomeric mixture then used in preparing the graft copolymer. This ability to control the quality of the side chain polymer is an important attribute of this invention. The average degree of polymerization of the residual polylactam is determined through analysis by standard titration procedures for amino end groups in terms of equivalents per weight of sample.]

The graft copolymers can be prepared in various ways. Convenient ways described herein can be identified as (1) the anhydride route, for use with ethylene/-maleic anhydride and other anhydride-containing trunk copolymers, and (2) the vicinal acid-acid or acid-ester route, for use with trunk copolymers having diacid or monoester of vicinal dicarboxylic acid substituents, respectively.

The anhydride route, which is preferred, involves simply heating together with mixing the trunk copolymer having carboxylic anhydride groups, preferably maleic anhydride, and the amino oligomer in the molten state, at a temperature in the range 75°-250° C., preferably at about 225° C., or in solution at a temperature of 75°-100° C. or higher. The heating temperature is above the melting point of the trunk copolymer and the reactive polymer. The time of reaction, which is dependent upon the temperature and rate of mixing, can vary from about 15 seconds to 60 minutes in the melt, preferably 1 to 10 minutes, and from 15 seconds to five hours in solution, preferably 1 to 10 minutes. Reaction in the melt, an especially preferred procedure, can conveniently be carried out on a roll mill, in a melt extruder, or in internal mixers having convoluted rollers, sigma blades, etc., using a temperature that will give short reaction time and as many passes as necessary to insure complete reaction. Completeness of reaction can be judged by the appearance of the product, good clarity in the melt indicating essentially complete reaction. With a roll mill as the reactor, the backbone copolymer and oligomer can be premixed or mixed during reaction on the mill; and because of the exposure it may be desirable to include stabilizing agents such as inhibitors or antioxidants, or to carry out the operation in a protective atmosphere such as nitrogen. With an extruder as the reactor, premixing is desirable. On the basis of IR analysis of the products, an interpretation of the course of the thermal reaction is that it may proceed through initial formation of amic acids to ultimate formation of amide or imide linkages between the backbone copolymer and the polyamide side chains, e.g.,:

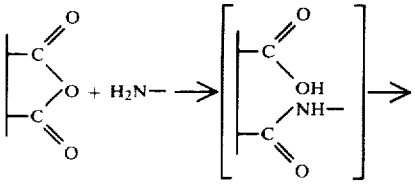

-continued

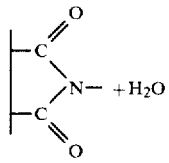

The amount of amino oligomer used can vary from a stoichiometrical deficiency to an equivalent amount, depending upon the extent of side chain substitution desired on the graft copolymer.

The vicinal acid-ester route has in general the operating characteristics of the anhydride route, i.e., it can be carried out in solution or in the melt for reaction times similar to those for the anhydride route described above. The graft copolymer is believed to be obtained by attachment of the oligomeric polyamide side chain to the backbone copolymer through imide linkages (with elimination of alcohol) which may be derived through intermediate formation of amic acids, e.g.,

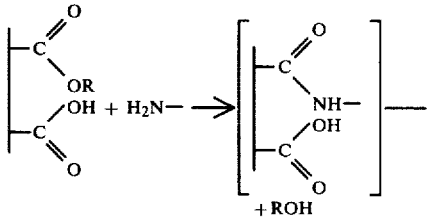

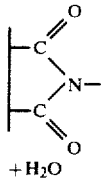

or by prior conversion of the vicinal acid-ester by loss of alcohol to an anhydride and reaction of the latter with the amino oligomer as described above. The description above of the anhydride route as carried out on a roll mill or in an extruder applies as well to the vicinal acid-ester route conducted in the same way.

The reaction of the amine group with the anhyride is fast, so that the effective reaction rate of polymers containing these groups is limited by other factors such as the rate of mixing. When two polymers are dissolved in solution, separately, and the two solutions poured together, rapid intimate mixing is obtained. The reaction can be completed in about 1 minute or less at about 100° C. As the temperature of the solution is increased the reaction can be completed in less than 1 minute, e.g., down to about 15 seconds.

When the two polymers are mixed in the melt, they are generally incompatible before the reaction takes place. The mixture is one of two incompatible liquids, and the reaction takes place, primarily, at the interface. As the reaction progresses, the melt blend becomes a single phase and the reaction goes very rapidly to completion, even at melt temperatures as low as about 100° C. Blended mixtures of the carboxylic backbone copolymers and the amino oligomeric polyamides are characteristically cloudy in the melt prior to completion of the grafting reaction. The mixtures, in contrast to the graft copolymers, can be extracted with suitable solvents to isolate the backbone copolymers and the lactam oligomers unchanged and in relatively pure state.

The graft copolymers are identified by the chemical reaction of the reactive site of the trunk copolymer with the reactive amine group of the side chain copolymer. This may be demonstrated by showing that the reactive site on the trunk copolymer has been reacted to form some other chemical entity. In the specific case of the anhydride group, the reaction may be demonstrated by known analytical methods.

For example, the progress of grafting can be followed by infrared spectroscopy. When the starting trunk polymer contains 5-membered, cyclic anhydride active sites, the disappearance of either one or two characteristic absorption bands at 5.4 microns or at 5.6 microns indicates that grafting is taking place. The proportion of the anhydride groups in the starting trunk polymer can be determined by forming a polymer film of known thickness and examining the infrared spectrum of such film. It has been found experimentally that 0.28 absorption units/0.025 mm at 5.4 microns or 2.2 absorption units/0.025 mm at 5.6 microns correspond to 10 weight percent anhydride. The absorption units are read directly from an infrared spectrogram.

Similarly, when the starting trunk copolymer contains vicinal carboxyl and alkoxycarbonyl groups, the characteristic infrared absorption band lies at 5.9 microns. Assuming the vicinal carboxyl and alkoxycarbonyl groups to be derived from ethyl hydrogen maleate, the characteristic absorption will be 1.1 absorption units/0.025 mm for every 10 weight percent maleate present. Such analytical techniques would not be practical in the case of a starting copolymer containing vicinal carboxyl groups. However, the concentration of carboxyl groups can be readily determined by simple titration.

The graft copolymer product can be characterized by several techniques, which show the presence of polyamide side chains, the degree of polymerization of the polyamide side chains, and the chemical identity of the polyamide, to name a few. Certain physical characteristics often are also helpful to show that a graft copolymer has been obtained.

The presence of polyamide is shown by infrared absorption at 6.0 microns (amide carbonyl). Other useful wave lengths include 6.4 microns (—NH bending) and 3.0 microns (—NH stretching). The proportion of polyamide is determined by Kjeldahl analysis for percent N.

The polyamide can be chemically identified by heating a sample of a graft copolymer with a mineral acid, for example, a sulfuric or hydrochloric acids, to about 200° C. or more. Under these conditions, the polyamide chain degrades to the starting lactam. Since $\epsilon$-caprolactam and $\omega$-laurolactam are volatile, they can be isolated and identified by any convenient technique of qualitative analysis.

Direct measurement of graft efficiency by extraction of unbound polyamide is difficult since solvents for polyamides also attack graft copolymers and most truck copolymers as well. Titration of the graft copolymers for reactive functionality provides no more than rough estimates of graft efficiency.

Determination of the increase of molecular weight due to grafting is a convenient technique. This is usually done by gel permeation chromatography of 0.5 percent graft copolymer solutions in m-cresol at 100° C. on porous polystyrene-packed columns.

A good indication that grafting has taken place is the torsion modulus of the product, especially at 100°–150° C. [While the polyamide grafted copolymer will have a fairly high modulus (e.g., $10^7$–$10^8$ dynes/sq. cm., ungrafted material will flow in that temperature range.]

The graft copolymers are identified as such, rather than mere mixtures of the trunk copolymers and polymers of the side chain type by a variety of tests. These include clarity of the melt, solubility properties, and in some cases, by their retention of elastic modulus at elevated temperatures. Blends of two polymers or of a polymer an oligomer are generally not compatible; molten blends consist, in general, of two immiscible phases. Such two phase systems are hazy because of the refractive index difference between the two types of polymers. When such a system changes from opaque or hazy to a clear product, it is strong evidence that an intimately joined graft polymer has been produced. The same optical test can be applied to samples in film form in the solid state at room temperature. Another well-known method for discriminating between a blend and a graft depends upon different solubility of the types of polymers involved. A third method is based on the very reason for making certain types of graft copolymers, i.e., the retention of physical properties at elevated temperatures. For these types, the blend will tend to lose its stiffness and to flow as the temperature is increased; some graft copolymers will better retain their stiffness and show less creep as the temperature is increased.

[With regard to polyamide resins knowing the average degree of polymerization (DP) of each starting side chain polymer, it is possible to plot DP versus the peak melting point of each resulting graft copolymer, as determined with a differential scanning calorimeter (DSC). It has been observed that the peak melting point increases as the DP of the side chains increases. Such a plot can serve as a calibration curve which can be used for the determination of the DP of the grafts in the copolymers of the present invention.]

[The polyamide graft copolymers must be conditioned for testing by first heating to 250° C., then cooling at the rate of 10° C. per minute to 50° C. During the test, the sample is heated at the rate of 10° C. per minute.]

DSC techniques are discussed in Thermoanalytical Methods of Investigation, by P. D. Garn, Academic Press, New York, 1965.

Another convenient and somewhat related technique for correlating the DP of the grafted polymer side chain with its melting point is differential thermal analysis (DTA). The sample also must be preconditioned and is heated during the test at the rate of 20° C. per minute. The details of the DTA technique are described in Differential Thermal Analysis, R. C. MacKenzie, Editor, Academic Press, New York, 1970; especially in Chapter 23, by C. B. Murphy, dealing with polymers, Vol. 1, pp. 643-671.

The process provides control of the type and length of the polymer side chain grafted onto the trunk copolymer. From the specific type of trunk copolymer the average frequency of possible reactive graft sites can be radily determined by the fraction, e.g., on a molar basis, of monomer molecules providing the reactive sites which are polymerized into the trunk copolymer. Since the polymeric side chains are preformed prior to reacting with reactive sites on the trunk copolymer excellent control of the graft copolymer is achieved. Thus there can be prepared a polymer side chain having either a narrow or broad molecular weight distribution. The polymer side chains of various distributions can be made at various times and then grafted at different times. It is possible to graft two or more different types of polymer side chains by means of the process. The thermoplastic graft copolymer prepared is relatively uncontaminated with ungrafted side chain polymer which may be a major problem in conventional free radical graft polymerization.

The advantage of this process in providing control of the side chain polymers is illustrated as follows: For one particular use, it may be desirable to have the side chain polymers of sufficient length so that these side chains can crystallize. Such a use was described to provide improved properties at elevated temperatures. For another use a certain type of side chain may be needed, but it may be important that the side chain is not long enough to provide a substantial amount of crystallization at room temperature. Such a case is found with polyethylene oxide side chains. For such chains, good anti-static behavior is obtained when the chains are mobile, i.e., non-crystalline. When the side chains of such a monomer contain more than about 80 chain atoms, the side chains will crystallize at room temperature and lose their good anti-static behavior.

The graft copolymers can be prepared with selected physical properties which make them useful in items such as flexible films and flexible tubing. The grafted products may have characteristic retention of modulus at elevated temperatures, a feature which extends the usefulness of films and tubes into temperatures which cause failure of articles made with merely blended mixtures of polyethylene and polyamides. Useful toughness (impact resistance) at lower temperatures can also be achieved. In certain uses, e.g., tubing for automotive applications, resistance to zinc chloride is most desirable. [Graft copolymers having polylaurolactam side chains have been found especially resistance to zinc chloride. Another unanticipated property of considerable value is the reduced water absorption shown by the graft copolymers in comparison with materials such as homopolycaprolactam (Nylon-6) or blends of Nylon-6 with polyethylene.]

The graft copolymers can be formed into shaped articles. Specifically graft copolymers such as those containing side chain polyethylene oxide polymers can be incorporated into a hydrocarbon polymer, e.g., polypropylene, to provide a high degree of anti-static behavior to polypropylene fiber. Ethylene graft copolymers can be blended with relatively low molecular weight thermoplastic resins to produce a hot melt adhesive. It has been found that the adhesive has greater resistance to failure at elevated temperatures than does an adhesive based on ungrafted ethylene copolymers. By grafting a polymethyl methacrylate side chain onto rubbery copolymers such as ethylene/vinyl acetate copolymers an impact modifier for a hard polyvinyl chloride matrix is providied.

EXAMPLES OF THE INVENTION

The following procedures and examples wherein the percentages and parts are by weight illustrate the invention. The temperatures are in degrees centigrade unless otherwise indicated.

The determination of physical and/or chemical properties of the starting copolymers was carried out as follows:

a. Inherent viscosity, deciliters per gram, was measured at 30° C. on a solution of 0.1 g. of polymer in 100 ml. of chloroform.

b. Neutralization equivalent was determined by acid-base titration using standard aqueous sodium hydroxide, the anhydride being titrated as diacid.

c. Wallace plasticity at 100° C. was determined according to the following procedure:

The Wallace plasticity is a measure of the amount of flow or deformation under load of unvulcanized elastomeric materials. The sample to be tested is sheeted and cut into pellets having a thickness in the range of 3.18 mm to 7.6 mm (0.125 to 0.300 inch). The test is done with a Wallace Plastimeter manufactured by H. W. Wallace and Co., Ltd., London. Initially, for a 15 second period, the tet pellet is compressed to a thickness of exactly one millimeter and heated to 100° C. Then the test pellet is subjected to a 10-kilogram load for exactly 15 seconds at 100° C. The final thickness of the test piece, expressed in units of 0.01 millimeter, is the plasticity reading.

d. Melt index was measured at 190° C. under a 2160 g. load—ASTM Method D 1238-73, Condition E or Condition A and then converted to an equivalent value for Condition E.

The degree of polymerization (DP) or molecular weight of the starting 6-nylons can be readily determined by end group analysis. The amino end groups are determined by titration with a strong acid, either in the presence of an indicator or by a potentiometric or a conductometric method. Acid end groups are determined by titration with a strong base. These techniques are discussed in Nylon Plastics, M. I. Kohan, Editor, pp. 38 and 105, John Wiley and Sons, New York (1973), and in Encyclopedia of Polymer Science and Technology, Vol. 10, pp. 542 and 543, John Wiley and Sons, New York (1969).

Preparation of Trunk Copolymers (Procedures A to U)

A. Prepartation of Ethylene/Methyl Acrylate/Monoethyl Maleate Copolymer

A terpolymer containing 46.4 percent ethylene, 50 percent methyl acrylate, and 3.6 weight percent monoethyl maleate and displaying a melt index of 3.6 g./10 min. was prepared in a 0.72-liter stirred autoclalve.

A mixture of methyl acrylate, monoethyl maleate, and benzene (weight ratio: 68.28/2.46/29.26) was pressured to about 422 kg./sq. cm.; ethylene was separately pressured to about 422 kg./sq. cm. Separate streams of this mixture (0.91 kg./hr.) and ethylene (6.35 kg./hr.) were joined and pressured to 1900 kg./sq. cm. The resulting feed stream then entered the autoclave. Simultaneously, a catalyst solution, made by adding 50 ml. of tert-butyl peroxypivalate to 4.5 kg. of benzene was introduced at the rate of 0.00204 kg./hr. to keep the temperature at 170° C. The effluent from the autoclave passed through a let-down valve to a chamber at atmospheric pressure where most of the residual monomers and solvent flashed off. The ethylene/methyl acrylate/-monoethyl maleate terpolymer thus isolated was freed from the small amount of residual volatiles by heating for 16 hours at 80° C. in a nitrogen stream. Acid-base titration indicated that 0.25 meq. of acid groups was present per gram of terpolymer. This corresponds to 3.6 weight percent of monoethyl ester of maleic acid.

B. Preparation of Ethylene/Vinyl Acetate/Maleic Anhydride Copolymer

A terpolymer containing 60.3 percent ethylene, 38 weight percent vinyl acetate, and 1.7 percent maleic anhydride, and displaying a melt index of 220 g./10 min. was prepared at the rate of 0.68 kg./hr. in a continuous 0.72-liter stirred autoclalve by the following procedure. Monomers were mixed, pressured to 1900 kg./sq. cm., and fed at these rates:

| | |
|---|---|
| Ethylene | 4.54 kg./hr. |
| Vinyl Acetate | 2.29 kg./hr. |
| Maleic Anhydride | 0.015 kg./hr. |

A solution of azobis(isobutyronitrile) in benzene was simultaneously introduced at a rate sufficient to keep the reactor temperature at 170° C. (about 0.587 g./hr. corresponding to 0.86 kg. catalyst per 1000 kg. of terpolymer). The total benzene feed was 1.04 kg./hr. The terpolymer produced was isolated by a procedure similar to that described in Procedure A. The weight percent of maleic anhydride was 1.7.

C. Preparation of Ethylene/Vinyl Acetate/Maleic Anhydride Copolymer

A terpolymer containing 65.6 percent ethylene, 32 percent vinyl acetate, and 2.4 percent maleic anhydride, and displaying a melt index of 125 g./10 min. was prepared at the rate of 0.63 kg./hr. in a continuous 0.72-liter stirred autocalve by the following procedure. Monomers were mixed, pressured to 1900 kg./sq. cm. and fed at these rates:

| | |
|---|---|
| Ethylene | 4.54 kg./hr. |
| Vinyl Acetate | 1.80 kg./hr. |
| Maleic Anhydride | 0.0258 kg./hr. |

A solution of azobis(isobutyronitrile) in benzene was introduced into the reactor at the same time and at a rate sufficient to keep the reactor temperature at 170° C. (about 1.00 g./hr. corresponding to 1.58 kg./1000 kg. of terpolymer). The total benzene feed rate was 0.67 kg./hr. The terpolymer produced was isolated by a procedure similar to that described in Procedure A. Acid-base titration with standard aqueous sodium hydroxide indicated that 0.49 meq. of diacid derived from anhydride groups was present per gram of terpolymer. The weight percent of maleic anhydride was 2.4.

$D_{(1)}$ Preparation of Ethylene/Ethyl Acrylate/Allyl Acrylate/Maleic Anhydride Tetrapolymer A 7.57-liter stirred autoclave was charged under nitrogen with 4000 ml. of methylene chloride, 400 grams of ethyl acrylate, 20 grams of maleic anhydride, 1.2 grams of allyl acrylate, and 1.0 gram of azobis-(isobutyronitrile). It was then sealed, charged with 300 grams of boron trifluoride, and pressured to 21 kg./sq. cm. with ethylene. The subsequent copolymerization at 25° C. was continued until pressure measurement indicated that ethylene uptake had ceased (about two hours later). The reaction was quenched by addition of 1 liter of diethyl ether. Volatiles were removed by steam-stripping in a well-ventilated hood. The terpolymer thereby obtained was dissolved in acetone, precipitated in water in a blender, and oven-dried. Yield: 415 grams.

This product had about 50 mole percent ethylene units and was slightly branched because of the use of the directive allyl acrylate. The polymer chain consisted principally of units-(E)-(B)-, where E is ethylene and B is selected randomly from ethyl acrylate, allyl acrylate, and maleic anhydride (2.5 weight percent).

$D_{(2)}$ Preparation of Ethylene/Ethyl Acrylate/Ethylene Diacrylate/Maleic Anhydride Tetrapolymer The procedure of $D_{(1)}$ above, was repeated except that 1.2 grams of ethylene diacrylate were used in place of the allyl acrylate. Yield: 479 grams. The branched tetrapolymer obtained had about 50 mole percent of ethylene units. The polymer chain consisted principally of units -(E)-(B')-, where E is ethylene and B' is randomly selected from ethyl acrylate, ethylene diacrylate, and maleic anhydride (3.8 weight percent).

$D_{(3)}$ Preparation of Ethylene/Ethyl Acrylate/Ethylene Diacrylate/Maleic Anhydride Tetrapolymer The procedure of $D_{(1)}$ above was repeated except that 0.75 gram of ethylene diacrylate was used in place of the allyl acrylate, and the amount of maleic anhydride was increased to 30 grams. Yield: 417 grams. The branched tetrapolymer had about 50 mole percent of ethylene units, the units being arranged -(E)-(B')-, as in $D_{(2)}$. The weight percent of maleic anhydride was 3.9.

$D_{(4)}$ Blend of Branched Alternating Copolymers

The branched copolymers made by procedures $D_{(1)}$, $D_{(2)}$, and $D_{(3)}$ were blended on a rubber roll mill. Table I gives the properties of the blend and its components.

TABLE I

| Copolymer D | Parts in Blend | Inh. Visc[a] | Wallace Plast. | Neut. Eq. meq./g. |
|---|---|---|---|---|
| (1) | 397 | 1.91 | 16.8 | 0.52 |
| (2) | 479 | 1.33 | 15 | 0.77 |
| (3) | 417 | 1.21 | 5 | 0.80 |
| Blend (4) | — | 1.75 | 14 | 0.70[b] |

[a]deciliters/gram: measured at 30° C. on solution of 0.1 g. copolymer in 100 ml. of chloroform.

[b]acid-base titration using standard aqueous sodium hydroxide, the anhydride being titrated as diacid, 3.4 weight percent of maleic anhydride.

E. Preparation of Ethylene/Ethyl Acrylate/Allyl Acrylate/Maleic Anhydride Tetrapolymer The procedure of Part $D_{(1)}$ was repeated except that the pressure of ethylene was 42.2 kg./sq. cm. Yield: 233 grams. The tetrapolymer had an inherent viscosity of 2.37 deciliters/gram, a Wallace Plasticity of 24.4, and a neutralization equivalent of 0.49 meq./gram. 2.4 weight percent of maleic anhydride was present.

$F_{(1),(2)}$ Preparation of Ethylene/Ethyl Acrylate/Allyl Acrylate/Maleic Anhydride Tetrapolymers The procedure of Part $D_{(1)}$ was twice repeated except that the amount of maleic anhydride was decreased each time to 10 grams. Yields: 481 grams and 497 grams. There was 1.8 weight percent of maleic anhydride in $F_{(1)}$ and 2.1 weight percent of maleic anhydride in $F_{(2)}$.

$F_{(3)}$ Preparation of Ethylene/Ethyl Acrylate/Ethylene Diacrylate/Maleic Anhydride Tetrapolymer The procedure of Part $D_{(1)}$ was repeated except that 0.75 gram of ethylene diacrylate was used in place of allyl acrylate. Yield: 476 grams. 2.3 weight percent of maleic anhydride was present.

$F_{(4)}$ Preparation of Blends of Branched Copolymers

A trunk copolymer composition was prepared by blending copolymers $F_{(1)}$, $F_{(2)}$, and $F_{(3)}$ on a rubber roll mill. Table II gives characteristic properties.

TABLE II

| Component | Parts in Blend | Inh. Visc. | Wallace Plast. | Neut. Eq. meq./g |
|---|---|---|---|---|
| $F_{(1)}$ | 336 | 1.97 | 15.5 | 0.36 |
| $F_{(2)}$ | 292 | 1.78 | 13.3 | 0.42 |
| $F_{(3)}$ | 241 | 1.52 | 14 | 0.46 |
| Blend $F_{(4)}$ | — | 1.44 | 13.5 | 0.43[a] |

[a]2.1 weight percent maleic anhydride was present.

G. Preparation of Ethyl Acrylate/Monoethyl Fumarate Copolymer

In a 3-neck round-bottom flask, a mechanically stirred mixture of 500 ml. of inhibited ethyl acrylate, 7.2 grams of monoethyl fumarate, and 0.25 gram of azobis-(isobutyronitrile) was purged with nitrogen for 30 minutes, then heated at 50° C. under a nitrogen blanket for 24 hours. The copolymer was isolated by steam-stripping in a well-ventilated hood and dried overnight in a nitrogen-bled vacuum oven at 70° C. Conversion was 86 percent. Prior to analysis and use, the copolymer was purified by dissolution in acetone, precipitation in water in a blender, and vacuum oven drying. Properties are given in Table III, below, 4.3 weight percent of mnoethyl ester of fumaric acid was present.

$H_{(1),(2)}$ Preparation of Ethyl Acrylate/Maleic Anhydride Copolymers

1. The reactor was a 2-liter resin flask fitted with an agitator, a condenser and a dropping funnel. A 710-ml. charge of ethyl acetate and 0.2 gram of benzoyl peroxide was added and stirred under nitrogen while being heated to reflux. A mixture of 500 grams of inihibitor-free ethyl acrylate, 10 grams of maleic anhydride, and 1 gram of benzoyl peroxide was placed in the dropping funnel. A 50-ml. charge of this monomer feed was added all at once to the stirred refluxing solution in the flask; the rest was added over a period of 3.5 hours. After an additional 2 hours at reflux, the reaction mixture was steam-distilled in a hood with good ventilation to remove solvent and residual monomers. The copolymer thus isolated was washed with water on a wash mill, partially dried on a hot rubber roll mill, and then heated in a nitrogen bled vacuum oven for 22 hours at 130° C. to remove residual volatiles. Yield: 448 grams.

2. The same equipment was used as in $H_{(1)}$ above. The ethyl acrylate/maleic anhydride copolymer was prepared as follows. A mixture of 500 grams of ethyl acrylate, 10 grams of maleic anhydride, and 0.5 gram of benzoyl peroxide was added to 490 grams of refluxing ethyl acetate over a 4-hour period. After about 85 percent of this feed mixture had been introduced, 140 ml. of cyclohexane and 35 ml. of ethyl acetate were added. When all the feed was in, 80 ml. more of ethyl acetate were added. Reflux continued for one hour. Heat was then removed and the mixture was allowed to stand for 36 hours. Finally, 0.5 gram of hydroquinone was added and the copolymer was isolated by steam-stripping the volatiles in a well-ventilated hood. Mill drying and vacuum oven drying (20 hours at 130° C.) followed. Yield: 364 grams.

Properties of the copolymers prepared as described in Procedures G. $H_{(1)}$ and $H_{(2)}$ are given in Table III.

TABLE III

| Copolymer | Maleic Anh. % | Inh. Visc.[a] | Wallace Plast. | Acidity[b] meq./g. |
|---|---|---|---|---|
| G | — | 2.32 | — | 0.30 |
| $H_{(1)}$ | 1.5 | 1.24 | 5 | 0.31 |
| $H_{(2)}$ | 1.4 | 1.03 | 14 | 0.29 |

[a] deciliters/gram: measured at 30° C. on a solution of 0.1 gram copolymer in 100 ml. of chloroform.

[b]acid-base titration with standard aqueous sodium hydroxide; values for $H_{(1)}$ and $H_{(2)}$ were each 0.15 meq./g. when alcoholic potassium hydroxide was used; proportion of maleic anhydride calculated from sodium hydroxide values.

I. Preparation of Ethyl Acrylate/Butyl Acrylate/-Monoethyl Fumarate Terpolymer

The reactor was a nitrogen-blanketed two-liter resin flask fitted with an agitator, a condenser, and a dropping funnel.

Monomeric ethyl acrylate and butyl acrylate were passed through alumina to remove polymerization inhibitors. Then, 70 grams of the ethyl acrylate, 70 grams of the butyl acrylate, 10.5 grams of monoethyl fumarate, 21 grams of "Igepal CO-730" [nonylphenoxy-poly(ethylene glycol) having about 15 —O—$CH_2$—$CH_2$—units], 1050 grams of water, and 1.0 gram of ammonium persulfate were added to the resin flask and heated to reflux. A mixture of 113 grams of ethyl acrylate, 113 grams of butyl acrylate, 9.4 grams of monoethyl fumarate, and 3.8 grams of Igepal CO-730 was gradually introduced at a rate to keep the reaction temperature at 89° to 93° C. after 1.4 hours, all the feed had been added and stirring was becoming difficult. After an additional 20 minutes, the temperature of the reaction mixture had risen to 96° C., whereupon 0.15 gram of hydroquinone was added, and residual monomers were removed by a 2-hour steam-distillation in a well-ventilated hood.

Coagulated polymer was washed by chopping in a blender with water, twice dissolved in acetone and reprecipitated in water in a blender, then air-dried, vacuum-oven dried 3.5 hrs. at 72 C., and finally mill-dried at about 130° C. Yield: 254 g. The terpolymer produced had an inherent viscosity (chloroform, 30° C.) of 1.51 deciliters/gram and an acid content of 0.24 meq./gram (titration with aqueous sodium hydroxide), or 0.23 meq./gram (titration with alcoholic potassium hydroxide). The terpolymer had 3.3 percent monoethyl fumarate; the remainder was believed to be about equally divided between ethyl acrylate and butyl acrylate.

J. EPDM/Maleic Anhydride Adduct

Maleic anhydride was grafted on an ethylene/-propylene/1,4-hexadiene copolymer. The ethylene/-propylene/1,4-hexadiene copolymer was a sulfur-curable elastomer having a Mooney (ML-1 +4/121° C.) viscosity of about 35 and the following monomer unit composition: ethylene, 61.4 weight percent; propylene, 32 weight percent; 1,4-hexadiene, 6.6 weight percent. The copolymer had about 0.5 gram mole of ethylenically unsaturated side chains per kilogram. Its Wallace Plasticity was about 28 at 100° C. and its inherent viscosity was about 2.0 (measured at 30° C. on a solution of 0.1 gram of copolymer in 100 milliliters of tetrachloroethylene). Copolymerization was carried out in solution in hexane in the presence of a Ziegler catalyst forming by mixing $VCl_4$ and diisobutylaluminum chloride.

A Werner and Pfleiderer 53 mm twin screw extruder was assembled by end-to-end attachment of sixteen barrel sections of 1.27 cm. diameter. Following a short feed section were four reaction sections (zones 1–4), one vacuum port section (zone 5), a cooling section (zone 6), and a die section. Provisions were made for the metering of molten maleic anhydride at the forward part of zone 1. The screws were composed of kneading blocks, reverse pitch screws, and transport screws arranged to generate 7.0–14.1 kg./sq. cm. pressure in zones 1–4 and no pressure in zone 5. The free volume of zones 1–5 was equivalent to 0.91 kg. of polymer at operating temperature. Zones 1–4 were preheated to 300° C., zone 5 to 260° C., and zone 6, the cross-head, and the die to 150° C.

The above ethylene/propylene/1,4-hexadiene copolymer was fed to the extruder in the form of chips which passed a 1.27 cm. screen. Maleic anhydride was metered to the extruder at an average feed rate of 4.8 percent of the polymer weight. The screw speed was 12 rpm. and the vacuum port was operated at about 63.5 cm. of Hg.

The product, extruded at the rate of 2.79 kg./hr., had a maleic anhydride content of 2.23 percent, as determined by infrared spectroscopy, and 2.19 percent by weight as determined by titration in tetrahydrofuran with 0.1 M tetrabutylammonium hydroxide in methanol. Wallace plasticity of the product was 33, and gel content was less than about 5 percent.

Following purification of a small sample by solution in tetrahydrofuran and precipitation with anhydrous acetone, the maleic anhydride content was 2.19 percent and 2.05 percent by weight, respectively, by infrared and titration determination. The gel content was less than about 5 percent. The inherent viscosity was 1.5 deciliters/gram as measured on 0.1 gram of adduct dissolved in 100 milliliters of perchloroethylene at 30° C.

The rest of the product was washed on a wash mill at 125° C. for 20 minutes and dried on a 15.2×30.5 cm. mill.

A series of additional ethylene trunk copolymers (Procedures K to V listed in Table IV) were prepared containing maleic anhydride as one comonomer by a copolymerization reaction described above.

TABLE IV

| Procedure | Ethylene Copolymer | Comonomer Ratio | Melt Index |
|---|---|---|---|
| K | Ethylene/Vinyl Acetate/ Maleic Anhydride | 78.4/20.1/1.5 | 12 |
| L | Ethylene/Vinyl Acetate/ Maleic Anhydride | 78.4/20.1/1.5 | 12 |
| M | Ethylene/Vinyl Acetate/ Maleic Anhydride | 73.8/24.6/1.6 | 26 |
| N | Ethylene/Maleic Anhydride | 96/4 | 15 |
| O | Ethylene/Maleic Anhydride | 87.7/12.3 | 750 |
| P | Ethylene/Vinyl Acetate Maleic Anhydride | 74/24/1.8 | 220 |
| Q | Ethylene/3-Methylbutene/ Maleic Anhydride | 10.8% Maleic Anhydride | 1700 |
| R | Ethylene/3-Methylbutene/ Maleic Anhydride | 21% Maleic Anhydride | 2000 |
| S | Ethylene/Vinyl Acetate/ Maleic Anhydride | 71/20/8.5 | 920 |

TABLE IV-continued

| Procedure | Ethylene Copolymer | Comonomer Ratio | Melt Index |
|---|---|---|---|
| T | Ethylene/Maleic Anhydride | 88/12 | 750 |
| U | Ethylene/Vinyl Acetate/ Maleic Anhydride | 60/38/1.7 | 220 |
| V | Ethylene/Vinyl Acetate/ Maleic Anhydride | 62/33/4.8 | 290 |

Preparation of Side Chain Polymers (amine terminated)

Procedure AA

A heavy glass tube was used to prepare a low molecular weight polymer. Into the tube was placed 50 g. of caprolactam, 10 ml. of n-hexyl amine, 0.25 ml. of water. The tube was flushed with nitrogen and sealed off under vacuum. The tube was heated to 220° C. for 15½ hours.

The polymer was removed from the tube and washed with hot water to remove residual unreacted caprolactam and amine and dried. The polymer was found to have a melting point of 165° C. by Differential Thermal Analysis (DTA). Analysis of end groups showed 940 milli-equivalents/Kg. of $NH_2$. These results were calculated to give a molecular weight of approximately 1050.

Procedure BB

In a procedure similar to that in Procedure AA, a polyamide was prepared. Components were 50 g. of caprolactam and 12.5 ml. of n-hexyl amine. The tube was heated to 255° C. for 20 hours. The polyamide had a melting point of 177° C.

Procedures CC to GG

A heavy stainless steel tube was used to prepare low molecular weight polyamide polymers. N-hexyl amine was used as the chin initiator in the amounts used as listed in Table V. Solid, normal standard purification caprolactam was used. This probably contained trace amounts of water. Otherwise water was excluded from the reaction to prevent initiation by water and subsequent termination of chains by carboxyl groups. The tube was evacuated and flushed with nitrogen to prevent oxidative reactions and then refilled with nitrogen before sealing and heating. The tube was agitated during the reaction period. In all procedures the tube was heated to 255° C. during this period.

TABLE V

| Procedure | Caprolactam g. | $H_2O$ Ml | N-Hexyl Amine Ml | Temp. °C. | Time Hrs. | DTA MP °C. | Milliequivalents/Kg $NH_2$ | Milliequivalents/Kg COOH | Mol. Wt. |
|---|---|---|---|---|---|---|---|---|---|
| CC | 50 | 0 | 9 | 255 | 16 | 187 | 943 | 1.7 | 1050 |
| DD | 50 | 0 | 10.5 | 255 | 16 | 193 | 871 | 2.6 | 1140 |
| EE | 50 | 0 | 11.5 | 255 | 16 | 196 | 877 | 1.7 | 1130 |
| FF | 50 | 0 | 10.5 | 255 | 16 | 193 | 1171 | 1.3 | 847 |
| GG | 150 | 0 | 31.5 | 255 | 16 | 191 | 1027 | 1.6 | 960 |

The analysis of the product was in terms of melting point and end-groups. The end-group analysis showed that only about 0.2 percent of the molecules were terminated by carboxyl groups.

Procedures HH to OO

In a manner similar to Procedures CC to GG polyamides were made as shown in Table VI. Reaction conditions were 255° C. for about 16 hours.

TABLE VI

| Procedure | Lactam | Amine | DTA MP °C. | Milliequivalents/Kg $NH_3$ | Milliequivalents/Kg COOH | Molecular Weight |
|---|---|---|---|---|---|---|
| HH | 50g. caprolactam | 20 g. stearyl amine | 204 | 934 | None detectable | 1062 |
| II | 50g. caprolactam | 5 g. butyl amine | 204 | 825 | " | 1208 |
| JJ | 50g. laurolactam | 10.5 ml n-hexylamine | 200 | 492 | " | >1800 |
| KK | 47.5g. caprolactam 2.5g. laurolactam | " | 189 | 1169 | " | 847 |
| LL | 45g. caprolactam 5g. laurolactam | " | 184 | 1113 | 8.4 | 892 |
| MM | 40g. caprolactam 109 laurolactam | " | 177 | 1103 | None detectable | 903 |
| NN | 80g. caprolactam 25g. laurolactam | 12 ml. n-hexylamine | 180 | 720 | 1.6 | 1390 |
| OO | 70g. caprolactam 30g. laurolactam | 4 ml. n-hexyl-amine | 173 | 345 | 8.0 | >1800 |

Procedures PP to XX

Amine-terminated polyamides were prepared by procedures PP-XX which are completely summarized in Table VII below. Additional details are provided for Procedures QQ, SS, VV and XX which are typical processes.

Procedure QQ

In each of two 400 ml. stainless steel rocker bombs was placed a mixture of 120 g. of caprolactam, 10 g. of stearyl-amine, 0.3 g. of diethyl phosphate, and 120 ml. of benzene. Both bombs were flushed with nitrogen, sealed under nitrogen, and shaken at 275° C. for 17 hours. The benzene-wet cakes of granular product were combined and soaked in acetone for 5 days, then extracted overnight with acetone in a Soxhlet assembly. The resulting powdery amine-terminated nylon product was air-dried in a hood, then vacuum-over dried at 50° C. for 1 hour. Analyses are in Table VII.

Procedure SS

A charge of 300 g. of caprolactam and 100 ml. of water was sealed under nitrogen in a 1.4-liter stainless steel rocker bomb and heated over a period of 2.1 hours to 280° C., held there for 3 hours, then cooled to room temperature. After an additional 650 ml. of water had been added under nitrogen, the bomb was again sealed and shaken while being subjected to the following temperature schedule: 1.2 hours heating to reach 210° 1 C., 15 minutes at 210° C., cooling over 20 minutes to 135° C., 2 hours at 135° C., then cooling over 1.2 hours to room temperature. The resulting product, a partial slurry of powder, granules, and cake, was partly dewatered by filtration, then chopped in a blender with fresh warm water. Acetone was added to increase slurry volume by 50 percent, and the solids were isolated by filtration. After being air-dried in a hood, then dried in a vacuum oven for 8 filled with at 100° C. (nitrogen bleed), the amine-terminated nylon product weighed 217 grams. Analyses are in Table VII.

Procedure VV

A charge of 769 grams of caprolactam, 32 grams of butylamine, and 15 grams of water was sealed under nitrogen in a 1.4-liter stainless steel rocker bomb, heated over a 2.5-hour period to 280° C., shaken at 280° C. for 7 hours, then cooled over a 3.2-hour period to room temperature. The product, a brittle cake, was mechanically chopped to a coarse granular condition. A 317.9-gram portion of the total product was rolled overnight in a sealed 7.57-liter jar with 1.42 liters of methanol. Insoluble material was collected on a filter, washed in two portions with 0.47 liter of methanol, briefly air-dried, and then dried in a nitrogen-bled vacuum oven for 3 hours at 75° C. Dry extracted product weighed 267.6 grams. Analyses of a smaller sample (15 grams) similarly extracted with methanol are shown in Table VII.

Procedure XX

A mixture of 70 grams of caprolactam, 6 grams of 1-octadecylamine, and 195 milliliters of diphenyl ether was placed in a 0.4 liter stainless steel rocker bomb. After the system had been evacuated and filled with nitrogen two times, it was closed under vacuum and shaken for about 8 hours at 260° C., heating and shaking continued for 2 days, the final temperature being 235° C.

The resulting mixture was washed on a filter with acetone and shaken for three days in acetone to remove diphenyl ether. The product was collected on a filter, washed with acetone, and extracted overnight in a Soxhlet extractor with acetone. Drying in air and then a vacuum desiccator at 50° C. gave the 6-nylon as a powder having an inherent viscosity of 0.21 deciliters/gram (at 30° C. in m-cresol) and 0.383. 0.388 eq. —NH 2 groups/kg. (corresponding to a molecular weight of about 2600 and a DP of about 21).

TABLE VII

| Nitrogen-Blanketed Polymerization Charge Composition. G. | Low Molecular Weight Amine-Terminated 6-Nylon Preparations PP | QQ | RR | SS | TT | UU | VV | WW | XX |
|---|---|---|---|---|---|---|---|---|---|
| Caprolactam | 140 | 240 | 295 | 300 | 283 | 283 | 769 | 769 | 70 |
| Stearylamine | 10 | 20 | | | | | | | 6 |
| Octylamine | | | 23 | | 32.2 | 20.8 | | | |
| Butylamine | | | | | | | 32 | 32 | |
| ε-aminocaproic acid | | | 5 | | | | | | |
| Water | | | | 100 | 4 | 4 | 15 | 15 | |
| Diethyl phosphate | 0.2 | 0.6 | | | | | | | |
| Diphenyl ether | 135 | | | | | | | | 195 |

TABLE VII-continued

| Nitrogen-Blanketed Polymerization Charge Composition. G. | Low Molecular Weight Amine-Terminated 6-Nylon Preparations | | | | | | | | |
|---|---|---|---|---|---|---|---|---|---|
| | PP | QQ | RR | SS | TT | UU | VV | WW | XX |
| Benzene | | 240 | | | | | | | |
| Post-polymerization Diluent. g.[a] | | | | | | | | | |
| Benzene | | | 300 | | | | | | |
| Water | | | | 650 | | | | | |
| Methanol | | | | | 451 | 451 | | | |
| Polymerization Conditions | | | | | | | | | |
| Hastelloy or stainless steel rocker tube vessel size, l | 0.4 | 2 × 0.4 | 1 | 1.4 | 1.4 | 1.4 | 1.4 | 1.4 | 0.4 |
| Reaction temperature, °C.[b] | 260 | 275 | 245.230 | 280.210 | 280.230 | 280.230 | 280 | 245 | 260.235 |
| Reaction time, hrs.[b] | 19.5 | 17 | 20.5 | 3.3 | 3.5.5 | 3.5.5 | 7 | 3 | 56 |
| Granulation Technique[c] | diluent | diluent | diluent | diluent | diluent | diluent | chopping | chopping | diluent |
| Purification Technique | | | | | | | | | |
| Overnight Soxhlet extraction solvent | acetone | acetone | | | | | | | acetone |
| Overnight reflux in 10× wt. solvent | | | water | | | | | | |
| Overnight roller extraction, solvent | | | | | | | methanol | | |
| Blender washing. solvent | | | | g | h | | | | |
| Centrifugation/decantation washing. solvent (reps.) | | | | | | methanol[g] | | | |
| After filtration collection, air drying: | | | | | | | | | |
| Vacuum oven ($N_2$-bleed) drying: Temp./Time (°C./hrs.) | | 50/1 | 100/40 | 100/8 | 100/15 | 100/24 | 75/3 | | |
| Purified 6-Nylon Properties | | | | | | | | | |
| Yield, g. | 101.5 | ~180 | ~258 | 217 | 250 | 222.2 | ~652 | 798.3 | |
| $NH_2$ end-groups, meq./g.[c] | 0.198 | 0.241 | 0.428 | 0.45 | 0.61 | 0.46 | ~0.46 | 0.495[f] | 0.383 |
| COOH end-groups, meq./g[e] | | | | | | | | | |
| $\tau$ inh (m-cresol, °30 C.) | 0.38 | 0.36 | 0.27 | 0.30 | 0.19 | 0.23 | ~0.29 | | 0.21 |
| DSC melting point, °C.[c] | 216 | 217 | 210 | 220 | 209.5 | 214 | ~217 | | |
| Molecular weight from $NH_2$ titration | 5050 | 4150 | 2336 | 2220 | 1640 | 2170 | 2170 | 2020 | 2600 |
| DP | 42.4 | 34.5 | 19.5 | 19.5 | 13.5 | 18 | 18.5 | 17 | 21 |

FOOTNOTES FOR TABLE VII

[a]Inert diluent provided the nylon in finely-divided form if the polymerizate was shaken with the diluent above the melting point of the nylon.

[b]The Table does not include times required to reach reaction temperature (usually 1.3–2.3 hours) or cool down (~1–3 hours). A second pair of temperature and time values refers to a second heating period after addition of post-polymerization diluent.

[c]A ~0.8-gram nylon sample is dissolved by warming in 25 ml. of o-cresol, and treated with 1.5 ml. of water, than 7.5 ml. of chloroform, cooled, and titrated potentiometrically (Breckman No. 39501 combination electrode) with standard 0.03N ethanolic potassium hydroxide.

[d]A ~0.1 gram nylon sample is dissolved by warming in 80-ml. m-cresol. After cooling, 10 ml. of chloroform is added and the resulting composition is titrated potentiometrically (glass-modified calomel electrode) with standard 0.01N 2,4-dinitrobenzenesulfonic acid in acetic acid.

[e]Samples were programmed at 10° C./min. through a cycle of 50° C. → 250° C. → 50° C. → 250° C., and the peak melting endotherm of the second heating cycle taken as the melting point. A shoulder at a lower temperature was usually observed.

[f]Caprolactam, residual amine initiator, and low oligomers had not been extracted before analysis.

[g]Blender washing, solvent, SS: (1) hot $H_2O$. (2) acetone/H

[h]Blender washing, solvent, TT: (1) methanol, (2) methanol/acetone (5/2).

Procedures YY to KKK

Procedure YY

Caprolactam/n-Hexylamine Oligomer

A 200-ml. pressure reaction was charged with 50 g. (0.442 mole) of ε-caprolactam (CL), 10 g. (0.099 mole) of n-hexylamine (HA) and 0.2 g. (0.011 mole) of water. The reactor was cooled in a dry ice-acetone bath, evacuatively purged twice with nitrogen, evacuated, and heated at 250° C. for 16 hours with the contents under autogenous pressure. The cooled product was a soft white solid. A 45-g. portion was extracted by centrifugation first with about 900 ml. of 1:1 acetone:water and secondly with acetone. The air-dried residue weighed 25.5 g., and could be readily crushed to a fine powder Analysis showed 865 equivalents of amino end groups per $10^6$ g., corresponding to a degree of polymerization (DP) of about 9. Differential scanning calorimetry (DSC) showed a major melting endotherm at 196°–198° C.

The above procedure, except that water was omitted, was used to prepare additional samples of CL/alkylamine oligomers. Reactors up to 1300-ml size were used as appropriate. The data for these preparations are presented in the following Table VIII.

TABLE VIII

| Procedure | Cl (g) | Amine (g) | Yield (g) | DSC mp (°C.) | End Groups (equ/$10^6$ g) $NH_2$ | End Groups (equ/$10^6$ g) $CO_2H$ | DP (Approx.) |
|---|---|---|---|---|---|---|---|
| | Caprolactam/n-Alkylamine Oligomers | | | | | | |
| ZZ[b] | 50 | HA. 5 | 20.8 | 205 | 710 | 54 | 12 |
| AAA | 100 | HA. 20 | 83.2 | 184 | 1162 | 5.8 | 7 |
| BBB | 50 | HA. 2.5 | 31.0 | 207–8 | 590 | 8.84 | 15 |
| CCC | 100 | HA. 20 | 78.0 | — | (1160) | — | 7 |
| DDD | 50 | HA. 5 | 38.0 | — | 785 | 27.6 | 10 |
| EEE | 50 | HA. 1.5 | 27.0 | — | 442 | 10.2 | 20 |
| FFF | 100 | HA. 20 | 71.2 | — | (1160) | — | 7 |

TABLE VIII-continued

| Procedure | Cl (g) | Amine (g) | Yield (g) | DSC mp (°C.) | End Groups (equ/$10^6$ g) $NH_2$ | End Groups (equ/$10^6$ g) $CO_2H$ | DP (Approx.) |
|---|---|---|---|---|---|---|---|
| Caprolactam/n-Alkylamine Oligomers | | | | | | | |
| GGG | 100 | HA. 29 | 47.0 | 177 | 1322 | 0.4 | 5.8 |
| HHH | 600 | HA. 120 | 529.5 | — | 1189 | 4.3 | 6.5 |
| III | 50 | HA. 53 | 24.3[d] | — | 2285 | — | 3 |
| JJJ | 200 | BA[c]0.29 | 171 | — | 1237 | — | 6.5 |
| KKK | 100 | ODA[c]. 54 | 108 | — | 1076 | — | 5.8 |

[a]All runs with acetone as primary extraction solvent.
[b]Reaction mixture also contained 50 ml. benzene and 0.2 g. diethyl phosphate; reaction run at 275° C.
[c]BA = n-butylamine; ODA = n-octadecylamine.
[d]Extracted with petroleum ether, benzene and diethyl ether.

Procedures LLL to NNN

Laurolactam/n-Hexylamine Oligomers

Following Procedure YY, except that a temperature of 300° C. was used, laurolactam/n-hexylamine (LL/HA) oligomers were prepared from laurolactam (cyclic lactam from 12-aminolauric acid) and n-hexylamine. The data are presented in the following Table IX.

TABLE IX

| Procedure | LL[a] (g) | HA (g) | Yield (g) | DSC mp (°C.) | End Groups (eq/$10^6$ g) $NH_2$ | End Groups (eq/$10^6$ g) $CO_2H$ | DP (Approx.) |
|---|---|---|---|---|---|---|---|
| Laurolactam/n-Hexylamine Oligomers | | | | | | | |
| LLL[d] | 100 | 50 | 48.5[b] | — | 1335 | — | 3.3 |
| MMM | 50 | 7.5 | 35.5[c] | 162 | 733 | — | 6.5 |
| NNN | 50 | 5.0 | 31.8[c] | 164 | 657 | — | 7.2 |

[a]All runs with 0.4% water, based on laurolactam.
[b]Acetone used as primary extraction solvent.
[c]Methanol used as primary extraction solvent.
[d]Run in 400-ml reactor.

Procedures OOO to PPP

Preparation of $NH_2$-Terminated 12-Nylons

Procedure OOO

A mixture of 59.6 grams of ω-alurolactam and 4.8 grams of 1-octadecylamine was heated in a glass polymer tube. After the resulting melt had been allowed to crystallize, 0.16 gram of diethyl phosphate $(CH_3CH_2O)_2PO_2H$ was added. The tube was then evacuated and filled with nitrogen about five times. While under vacuum the neck of the tube was sealed. The mixture was then heated at about 285° to 288° C. for about 9.5 hours. The 12-nylon obtained (yield about 45 grams) had a melting point of about 145°-150° C., an inherent viscosity of 0.34 (at 30° C. in m-cresol), and 0.225, 0.226 equivalent of $—NH_2$ groups per kilogram (corresponding to a molecular weight of 4430 and a DP of about 21).

Procedure PPP

A mixture of 50 grams of ω-laurolactam and 10.5 ml. (13.8 g.) of n-hexylamine was placed in a heavy stainless steel tube, which was evacuated, flushed with nitrogen, and filled with nitrogen, then sealed and heated 16 hours at 255° C. The resulting nylon contained 0.492 equivalent of $—NH_2$ groups per kilogram. The molecular weight of the nylon thus was about 2030 and its DP was about 9.5

Additional 12-Nylons

Additional 12-nylons were made by method PPP using n-hexylamine as the polymerization initiator. The products had DP's of 5.3, 7.0, 10.2, 14.3, 15.6, 24.0, and 15.6, respectively.

[EXAMPLES 1-13]

[The following tests were used in the Examples to provide property measurements of the graft copolymers.]

[The Izod Impact Strength test (Izod) was determined by standard ASTM D 256-73. Samples are compression molded in a lab press at 190° C. in the form of 76 mm×76 mm×3.18 mm sheets. Bars 63.5 mm×12.7 mm are cut from the sheet and notched as specified in ASTM D 256-73. Samples are allowed to condition at room temperature for 16-24 hous, after cutting and notching, before testing. Five bars of each sample are tested and the average value reported as the Izod Impact Strength in kg.-cm./cm. of notch.]

[Variable Height Impact was determined by compression molding sheets in a press at 190° C. to a thickness of 0.76-1.02 mm. These are allowed to condition at room temperature for 16-24 hours before testing. The test is run using a Gardner Impact Tester, Model IG-1120M. The tester has a 3.63 kilogram weight with a 12.7 mm diameter ball end. It is dropped onto a sample supported on a metal plate having a 16.3 mm diameter hole directly under the impact point of the weight. The weight falls through a tube which is marked in kg.-cm. The point at which the weight is released is recorded as the impact energy for that drop. The force at which 50 percent of the samples break is reported as the Gardner Impact Strength in kg.-cm. The samples may be measured as to thickness and the values reported as impact strength in kg.-cm./mm.]

[Vapor Pressure Osmometry was determined by a standard method described in R. U. Bonnar, M. Dimbat and F. H. Stross, Number-Average Molecular Weights, Interscience, N.Y., 1958. This is a solution method; the solvent must be a good solvent for the material being evaluated. A preferred solvent was o-dichlorobenzene, and the test temperature was 100° C.]

[Flexural Modulus was measured by standard ASTM D-790-71 or as modified. Samples are compression molded at 190° C. in a laboratory press in the form of 127 mm×12.7 mm×3.18 mm bars (or 50.8 mm×12.7 mm film). The bars (film) are conditioned at room temperature 16-24 hours before testing. The test is conducted using a 50.8 mm (or 25.4 mm) span at a crosshead speed of 1.27 mm/min. (or 5.1 mm/min.). The tangent modulus of elasticity (flexural modulus) is calculated using the equation given in the ASTM procedure. The value obtained is expressed in flex modulus in kg./sq. cm.]

[Heat Deflection Temperature was determined by compression molding samples in a laboratory press at 190° C. in the form of 127 mm×12.7 mm×3.18 mm bars. These bars are tested in accordance with the procedure stated in ASTM D 648. The bars are allowed to condition at room temperature for 16–24 hours before testing. Weights are placed on the loading rod to obtain a fiber stress of 18.56 kg./sq. cm. and the bars are heated in a bath until a deflection of 0.25 mm is measured. The temperature at which the bar is deflected 0.25 mm is reported as the deflection temperature at 18.56 kg./sq. cm. fiber stress.]

[Preparation of Graft Copolymers]

[Table X below summarizes the preparation, composition, and properties of representative graft copolymers of the present invention.]

[For all graft products, slabs for testing could be prepared by brief compression molding at 235° 1 C., followed by rapid (~2 min.) cooling and immediate demolding. Annealing of these slabs at 135° C. for 4 to 5 hours generally improved compression set about 20 to 35 points but had little effect on other properties. The grafting procedure used in Example 7 of Table X is illustrative of the process:]

[A mixture of 36 grams of the ethylene/vinyl acetate/maleic anhydride trunk copolymer of Procedure C, 14 grams of the powdered low molecular weight, $H_2N$-terminated 6-nylon of Procedure SS, 0.1 gram of tris(-mono-and di-nonylphenyl) phosphite stabilizer ["Polygard" from Uniroyal], 0.1 gram of stabilizer N-phenyl-N'-(p-toluenesulfonyl)-p-phenylene-diamine ["Aranox" from Uniroyal], 0.1 gram of 1,3,5-trimethyl-2,4,6-tris(3,5-di-tert-butyl-4-hydroxybenzyl)benzene ["Ionol 330" from Shell], and 0.05 gram of a 7:1 weight mixture of potassium iodide and cuprous iodide was homogenized as thoroughly as possible on an unheated rubber roll mill. The resulting blend was then transferred to an electrically heated mill held at 215° C. and masticated at 215° C. under a partial nitrogen blanket for 15 minutes to effect grafting. At this point the material was ready for fabrication.]

[TABLE X

| | Graft Copolymer Preparation, Composition, and Properties | | | | | | | | | | | | |
|---|---|---|---|---|---|---|---|---|---|---|---|---|---|
| Example | 1 | 2 | 3 | 4[a] | 5 | 6 | 7 | 8 | 9 | 10 | 11 | 12 | 13 |
| Trunk Copolymer "type[b] | E Branched Alt. E/EA/AA/MAnh | $F_{(4)}$ Blend Branched Alt. E/EA/MAnh | $D_{(4)}$ as in Ex. 2 | $F_{(1)}$ as in Ex. 1 | $H_{(2)}$ EA/MAnh | $H_{(1)}$ as in Ex. 5 | C E/VAc/MAnh | B as in Ex. 7 | A E/MA/MAME | A as in Ex. 9 | G[c] EA/FAME | I[c] EA/BA/FAME | I as in Ex. 12 |
| "graft site | MAnh | as in Ex. 1 | as in Ex. 1 | as in Ex. 1 | as in Ex. 1 | as in Ex. 1 | as in Ex. 1 | as in Ex. 1 | MAME | as in Ex. 9 | FAME | as in Ex. 11 | as in Ex. 11 |
| "graft site conc. meq./g. | .235 | .215 | .35 | .18 | .15 | .155 | .245 | .173 | .25 | .25 | .29 | .24 | .24 |
| Side chain polymer "initiator[d] | UU Octylamine | VV Butylamine | WW as in Ex. 2 | PP Stearyl $NH_2$ | QQ as in Ex. 4 | SS $H_2O$ | TT as in Ex. 1 | RR as in Ex. 1 | TT as in Ex. 1 | TT as in Ex. 1 | TT as in Ex. 1 | TT as in Ex. 1 | TT as in Ex. 1 |
| "$NH_2$ conc. meq./g. | .46 | ~.46 | ~.495 | .198 | .24 | .45 | .61 | .428 | .61 | .61 | .61 | .61 | .61 |
| phr Nylon[e] | 50.6 | 40 | 50 | 80 | 55 | 30 | 39 | 34 | 40 | 39 | 50 | 39 | 39 |
| Graft Reaction Apparatus | Extruder | Plastograph[f] | Plastograph | Plastograph | Plastograph | Mill[g] | Mill | Plastograph | Extruder | Mill | Mill | Mill | Plastograph |
| Graft Reaction Conditions: | | | | | | | | | | | | | |
| Reactor Wall Temp. °C.' | ~230 | 220 | 220 | ~210 | | | | | | | | | |
| e | ~210[i] | 220 | 1215 | 220 | ~230 | 215 | 210 | 210 | 220 | | | | |
| Residence Time. min. | ~16.4 | 10 | 10 | 20 | 20 | 15 | 15 | 18 | ~6.7 | 15 | 12 | 12 | 10 |
| Graft Copolymer Physical Properties[j] | | | | | | | | | | | | | |
| Shore A Hardness | 83 | 76 | 81 | 85 | 77 | 64 | 91 | 85 | 67 | 63 | 92 | 83 | 71 |
| Tg. Kg./cm.$^2$ | 224 | 220 | 165 | 189 | 159 | 120 | 167 | 162 | 141 | 134 | 139 | 97 | 87.9 |
| Eg. % | 370 | 460 | 430 | 300 | 220 | 270 | 390 | 330 | 480 | 500 | 180 | 210 | 240 |
| $M_{100}$, Kg./cm.$^2$ | 85.8 | 67 | 58 | 110 | 79.4 | 58 | 78.4 | 84 | 48 | 28 | 115 | 70 | 34 |
| Comp. Set (22 hrs./70° C., | | | | | | | | | | | | | |

[TABLE X-continued

| Example | 1 | 2 | 3 | 4[a] | 5 | 6 | 7 | 8 | 9 | 10 | 11 | 12 | 13 |
|---|---|---|---|---|---|---|---|---|---|---|---|---|---|
| | Graft Copolymer Preparation, Composition, and Properties | | | | | | | | | | | | |
| Method B), % | 23 | 22 | 35 | 33 | 26 | 35 | 32 | 34 | 28 | 34 | 37 | 38 | 42 |

FOOTNOTES FOR TABLE X

[a]A small amount (0.4 phr) of aniline was added after the grafting reaction.

[b]E = Ethylene; EA = ethyl acrylate; (alt.) refers to alternating, rather than random copolymer, VAc = vinyl acetate; MA = methyl acrylate; BA = butyl acrylate; AA = allyl acrylate; MAnh = maleic anhydride, MAME = monoethyl maleate; FAME = monoethyl fumarate. These units are copolymerized in the trunk copolymer.

[c]Mill blends were treated 15 hours in a nitrogen-bled 130° C. vacuum oven just before the grafting reaction. Subsequent experiments showed that this treatment had negligible effect on product physical properties.

[d]The alkyl group of the initiator becomes one end-group of nearly all the polymer chains. The other end-group is nearly always $NH_2$.

[e]Parts of nylon by weight per hundred parts of trunk copolymer.

[f]Brabender Plastograph, an apparatus having a small, electrically heated chamber with two convoluted rollers capable of shear-mixing and masticating polymer at a selected high temperature.

[g]An electrically-heated mill was used for the required temperature.

[h]Polymer is not necessarily at this temperature at all times. There is usually an initial warm-up period followed by a modest overshoot, perhaps because of an exothermic reaction.

[i]Accurate temperature redings were not obtained here.

[j]All graft products, in addition to the components listed here, contained a mixture of stabilizers quite similar to that described in the detailed Example (7). The following ASTM methods were used: Shore A. D-2240-68: Tensile Stress ($T_B$). D-412-68: Tensile Strain ($E_B$). D-412-68: Stress at 100% Elongation ($M_{100}$). D-412-68: (all values measured at 25° C.). Compression Set after 22 hours at 70° C., D-395-67. Specimenas were annealed for 4 hours at 135° C.]

[EXAMPLES 14–22]

[Preparation of Additional 6-Nylon and of 12-Nylon Graft Copolymers Based on Ethylene/Methyl Acrylate/Monoethyl Maleate Copolymers]

[TABLE XI

| Example | 14 | 15 | 16 | 17 | 18 | 19 | 20 | 21 | 22 |
|---|---|---|---|---|---|---|---|---|---|
| Trunk Polymer | | | | | | | | | |
| % Ethylene | 36.3 | 36.3 | 40.6 | 40.6 | 42.8 | 42.8 | 42.8 | 42.8 | 40.8 |
| % Methyl Acrylate | 39.7 | 39.7 | 50.8 | 50.8 | 51.4 | 51.4 | 51.4 | 51.4 | 50.8 |
| % MAME | 24 | 24 | 8.64 | 8.64 | 5.76 | 5.76 | 5.76 | 5.76 | 8.84 |
| Melt Index | 32.8 | 32.8 | 6.6 | 6.6 | 4.5 | 4.5 | 4.5 | 4.5 | 6.6 |
| Nylon | 6 | 6 | 6 | 6 | 6 | 6 | 12 | 6 | 12 |
| DP | 7.0 | 7.0 | 10.2 | 14.3 | 24.0 | 24.0 | 15.6 | 39.5 | 5.3 |
| End Group | H.A.[a] | H.A.[a] | COOH | COOH | COOH | COOH | H.A.[a] | COOH | H.A.[a] |
| % Polyamide | 25 | 35 | 25 | 33 | 25 | 35 | 25 | 40 | 25 |
| Reaction Type | Roll Mill | Roll Mill | Roll Mill | Roll Mill | Roll Mill | Roll Mill | Roll Mill | Extruder | Extruder |
| Equiv. Ratio ½ MAME/$NH_2$ | 2.23 | 1.38 | 1.05 | 1.00 | 1.63 | 1.02 | 1.90 | 1.34 | 1.04 |
| DTA Melt. Pt., °C. | | | | | | | | | |
| Peak | 158.165 | 180 | 207 | 209 | 214 | 212 | 168 | 208 | 158 |
| End | 220.231 | 195 | 213 | 213 | 219 | 219 | 175 | 217 | 163 |
| Flex. Modulus, kg./cm$^2$ | 552 | 1083 | 91 | 178 | 132 | 23 | 30 | 1019 | 510 |
| Tensile Strength, cm.$^2$ | 61 | 92 | 68 | 62 | 61 | 25 | 44 | 145 | 98 |
| Elongation at break, % | 190 | 130 | 400 | 230 | 120 | 300 | 620 | 310 | 190 |
| Torsion Modulus × $10^{-9}$, dynes/cm.$^2$ | | | | | | | | | |
| −180° C. | 12.66 | 14.77 | 14.90 | 16.19 | 15.54 | 15.29 | 27.59 | 14.41 | 14.69 |
| −100° C. | 9.80 | 11.94 | 10.18 | 11.84 | 11.07 | 9.23 | 16.97 | 9.59 | 8.96 |
| −50° C. | 7.41 | 8.42 | 4.76 | 6.65 | 5.42 | 5.60 | 9.39 | 5.54 | 6.20 |
| 0° C. | 1.57 | 2.13 | .07 | .20 | .18 | .06 | .10 | 1.00 | .22 |
| 20° C. | .90 | 1.64 | .05 | .16 | .16 | .04 | .10 | .89 | .18 |
| 50° C. | .28 | .60 | .04 | .11 | .12 | .03 | .08 | .65 | .12 |
| 100° C. | .09 | .20 | .02 | .05 | .06 | .01 | .04 | .20 | .06 |
| 150° C. | .04 | .11 | .015 | .04 | .04 | — | — | .12 | .02 |

[a]N-hexylamido group. $-\overset{O}{\overset{\|}{C}}-NH-C_6H_{13}$]

[Copolymers of ethylene, maleic anhydride (MA), and monoethyl maleate (MAME) were prepared according to the method A, above, except that the proportions of the comonomers were varied. Grafting of low molecular weight 6-nylons and 12-nylons was accomplished either on a roll mill under nitrogen blanket at about 225° C. or in a twin screw extruder at about 225° C. Detailed information on these preparations is presented in Table XI, below.]

[For testing for tensile strength and flexural modulus the specimens were injection molded at 225°–235° C. and held under nitrogen for at least one day at 23° C. The following test procedures were used:]

[For tensile strength and elongation at break ASTM D-638-72. For flexural modulus D 790-71. Torsion modulus values were measured in the manner described in Anelastic and Dielectric Effects in Polymeric Solids by N. G. McCrum, B. E. Read and G. Williams, pps. 192–195. Johwn Wiley and Sons, Inc., New York (1967). For melt index standard test ASTM D-1238-73, Condition E or Condition A and then converted to an equivalent value for Condition E.]

[EXAMPLES 23 AND 24]

[Preparation of 6-Nylon and 12-Nylon Graft Copolymers and EPDM Copolymers]

[A Brabender Plastograph was used having a capacity of about 50 grams and heated by circulting oil (temperature 250° C.). Revolving cam-shaped blades kneaded and sheared. A nitrogen blanket was maintained at all times.]

[After 30 grams of the EPDM copolymer-maleic anhydride adduct J, above, had been added, an antioxidant mixture, and oil mixture, and an amino-terminated 6- or 12-nylon (XX or OOO, above) were added successively as quickly as possible. Mixing then continued for 12 minutes. The resulting nylon graft copolymer was dumped. Table XII gives the properties of a 6-nylon and a 12-nylon graft.]

[The antioxidant mixture employed (0.7 gram) consisted of 0.3 gram of N-phenyl-N'-(p-toluenesulfonyl)-p-phenylenediamine [Aranox], 0.3 gram of 1,3,5-trimethyl-2,4,6-tris(3,5-di-tert-butyl-4-hydroxybenzyl) benzene [Ethyl Antioxidant 330, formerly Ionox 330], and 0.1 gram of a 7:1 weight mixture of potassium iodide and cuprous iodide.]

[The oil mixture consisted of the antioxidant tris(-mono- and di-nonylphenyl) phoshite ["Polygard" from Uniroyal] and "Sunpar" paraffinic oil 2280 [ASTM D-2226 type 104B, having Saybolt Universal Viscosity values of 2907 sec. and 165 sec. at 37.8° C. and 98.9° C., respectively; specific gravity, 0.8916 (at 15.6° C.); density, 0.8879 g./cc.; molecular weight, 720; viscosity-gravity constant, 0.796; refractive index $D^{20}$, 1.4908]. All mixtures contained 0.3 gram of the antioxidant; the oil amounted to 10.5 grams for 6-nylon grafting and 8.5 grams for 12-nylon grafting.]

[TABLE XII

| Properties | 6-Nylon Graft | 12-Nylon Graft |
|---|---|---|
| Tensile Strength, kg./sq.cm. | 97.7 | 79.4,66.1 |
| Extension at Break, % | 680 | 620,660 |
| Modulus at | | |
| 100% Extension, kg./sq.cm. | 26.7 | 33.7 |
| 200% Extension, kg./sq.cm. | 36.6 | 40.1 |
| 300% Extension, kg./sq.cm. | 47.1 | 46.4 |
| Permanent Set at Break, % | 40 | 80 |
| Compression Set (Method B, 22 hrs./70° C.) % | 77 | 83 |
| Shore A hardness | 66 | 84 |
| Fast Tear, 127 cm./min., kg./cm.] | 11.8 | 21.4 |

[EXAMPLE 25]

[The ethylene copolymer of Procedure K and the polyamide of Procedure AA were dissolved in hot hexamethyl phosphoramide. The solutions of the polymers were mixed to give a ratio of 5 parts of the ethylene copolymer to 1 part of the polyamide. This solution was kept hot for about 5 minutes and then poured into rapidly stirred cold acetonitrile to precipitate the polymer. It was then filtered and washed with acetone to remove excess solvent and dried.]

[A film was melt pressed at 185° C.]

[The infrared spectrum showed almost complete reaction of the anhydride group, indicating that the short polyamide chains had been attached to the longer ethylene copolymer as side chains.]

[EXAMPLE 26]

[Twenty grams of an ethylene copolymer (Procedure L) and 4 g. of a polyamide (Procedure BB) were blended on a two-roll, electrically heated mill at 175° C. for 5 minutes.]

[The infrared spectrum of the resultant reaction product showed almost complete reaction of the anhydride groups.]

[EXAMPLES 27 and 28]

[In a manner similar to Example 25 the polyamides of Procedures HH and II were reacted with the ethylene copolymer of Procedure M in a solution of benzyl alcohol.]

[The infrared spectrum showed that over 50% of the anhydride groups had reacted.]

[EXAMPLE 29]

[Thirty grams of polyethylene which was modified by copolymerization with 4% maleic anhydride (Procedure N) was blended on a two-roll mill at 200° C. with 12 g. of a polyamide (Procedure GG).]

[The sample was molded at 230° C. to give a clear film. The infrared spectrum showed that over 80% of the anhydride groups had reacted.]

[EXAMPLES 30 to 36]

[In a manner similar to Examples 25 and 26 a series of graft polymers were made using components as shown in Table XIII.]

[The melting point of Example 32 was found to be 189° C. (by DTA measurement).]

[EXAMPLES 37, 38, 39]

[Three graft copolymer resins were made by reaction of the molten polymer on a two roll mill at 200° C. for 2 minutes as described in previous examples. The tensile properties of the graft copolymer are given in Table XIV with a comparison with the ungrafted ethylene copolymers. This shows the vastly increased tensile strength imparted to the ethylene copolymers due to the presence of the polyamide side chains.]

[TABLE XIII

| Example Number | Ethylene Copolymer (Procedure) | | Polyamide (Procedure) | | Blend Method |
|---|---|---|---|---|---|
| 30 | 26 g. | O | 13 g. | GG | Mill 200° C. |
| 31 | 40 g. | P | 8 g. | MM | Mill 200° C. |
| 32 | 40 g. | P | 8 g. | NN | Mill 200 ° C. |
| 33 | 26 g. | Q | 13 g. | NN | Mill 180 ° C. |
| 34 | 6 g. | R | 3 g. | NN | Solution Hexamethyl Phosphor-amide |
| 35 | 25 g. | N | 10 g. | OO | Mill 190° C. |
| 36 | 26 g. | V | 13 g. | GG | Mill 200° C.] |

[TABLE XIV

| Example Number | Ethylene Copolymer (Procedure) | Caprolactam Polymer (Procedure) | Tensile Strength kg./cm.$^2$ | Elongation % |
|---|---|---|---|---|
| 37 | U | GG | 101.6 | 555 |
| | | | 27.8 (Control Procedure T) | 1400 |
| 38 | N | GG | 231.3 | 475 |
| | | | 111.1 (Control Procedure M) | 400 |
| 39 | P | GG | 141.7 | 530 |
| | | | 82.3 (Control Procedure O)] | 700 |

[EXAMPLES 40 and 41]

[The value of graft copolymers such as described above in an adhesive system is revealed when the adhesive is tested for resistance to failure at elevated temperatures. The use of the graft copolymers of Examples 33 and 36 in a hydrogenated wood rosin ester, Hercules' Foral 105 is described below.]

[Example 40 consists of a blend containing 65% Foral 105 and 35% of the graft copolymer of Example 33 melt blended on a 2-roll mill at 185° C. This blend was coated on kraft paper using a hot plate and a meyer rod. This coated paper was then sealed to a second, uncoated piece of kraft paper at 200° C. for 3 seconds at 0.70 kg./sq. cm. pressure The coated sandwich was cut into 12.7 mm strips for testing in peel. A 50 g. weight was used to try to pull the strips apart in peel.]

[Example 41 consists of a similar blend based on 65% Foral 105 and the graft copolymer of Example 36. A similar sandwich between pieces of kraft paper was made, cut, and weighted for testing.]

[A blend of 65% Foral 105 and a high molecular weight, ungrafted, ethylene/vinyl acetate copolymer, Elvax 260, was made. This was used to bond two pieces of kraft paper for testing as a control for the above two examples. The results are given in Table XV.]

[TABLE XV

| Sample | Failure Temperature °C., For Peel of Bonds In Oven |
|---|---|
| Control | 65-70 |
| Example 41 | 90-95 |
| Example 40 | 115-120] |

EXAMPLE 42

Ten grams of an ethylene copolymer (Procedure M) were dissolved in hot toluene. To this hot solution were added 2 ml. of a polyethylene oxide product which is a polymer of about 360 molecular weight (about 8 ethylene oxide repeat units) and for which most of the chains are terminated on one end by a primary amine ($—NH_2$) and on the other end by an alkyl group. The material was supplied by Jefferson Chemical Company and designated amine 4419—35. They report a molecular weight of 360, based on a primary amine content of 2.71 milliequivalents per gram. The resultant solution was maintained at about 110° C. for 5 minutes. The solvent was evaporated and the solid product was melt pressed into a clear film.

The infrared spectrum of this sample showed that essentially all of the anhydride groups of the ethylene copolymer had reacted with the amine ends of the polyethylene oxide chains.

EXAMPLE 43

Five grams of an ethylene copolymer (Procedure S) were dissolved in hot toluene. To this hot solution was added 1 gram of the amine terminated polyethylene oxide material of Example 42. The solvent was evaporated and the solid product was melt pressed into a 10 mil film. The film was tested on a Keithly Electrometer No. 610B by ASTM D 257 and found to have a volume resistivity of $10^9$ ohm cm. In contrast a control, ungrafted ethylene/vinyl acetate copolymer (28% vinyl acetate) had a volume resistivity of $4.4\times10^{13}$ ohm cm. Thus, the graft copolymer has a conductivity 44000 times that of the ungrafted resin.

EXAMPLE 44

Five grams of an ethylene copolymer (Procedure R) were reacted with 2 ml of the amine terminated polyethylene oxide polymer of Example 42 and by the same procedure. The solid film was tested and found to have a volume resistivity of $6.7\times10^7$ ohm cm. Thus, this resin has a conductivity almost 1 million times that of the ungrafted resin in Example 43.

EXAMPLE 45

Preparation of Terminal Amine-Containing Polypivalolactone

To 51.9 g. of 10 percent aqueous tetrabutylammonium hydroxide was added 3.02 g. of p-aminophenyl acetic acid. The resulting solution was evaporated in vacuo to an amber oil which was dried in vacuo to a green solid which was washed with tetrahydrofuran to give 4.7 g. of nearly colorless crystals of tetrabutylammonium p-aminophenyl acetate (hygroscopic).

To a stirred solution of 50 g. of pivalolactone in 100 ml. of anhydrous tetrahydrofuran in a 500-ml. resin kettle was added a solution of 4.7 g. of tetrabutylammonium p-aminophenyl acetate in 10 ml. of methanol. After 5 minutes, an exothermic polymerization occurred with vigorous refluxing and precipitation of polymer. The polymer was collected by filtration and washed twice with ethanol in a Waring Blendor and dried at 70°/0.1 mm. to give 51.7 g. of amine-terminated polypivalolactone, $\eta_{inh}=0.15$ (0.5 percent in trifluoroacetic acid, 25°).

Anal. Calcd. for dp 42 $C_{234}H_{380}O_{86}N_2$: C, 61.1; H, 8.35; N, 0.61. Found: C, 61.3; H, 8.28; N, 0.42; C, 60.9; N, 8.26; N, 0.41.

Differential scanning calorimetry: first heating, $T_m$ 197° C., $T_{m2}$ 200° C.

Grafting Ethylene/Methyl Acrylate/Half Ethyl Ester of Maleic Acid and Amine-Terminated Polypivalolactone Using a 76.2 mm, two roll roller mill preheated to 225° C., 24 g. of terminal amine-containing polypivalolactone was first melted (amber color) and 41 g. of a copolymer derived from 54 weight percent methyl acrylate, 4.5 weight percent half ethyl ester of maleic acid, and 40.5 weight percent ethylene. The polymers were rolled for 13 minutes. Initially, vapors were observed, but they soon ceased. Sixty grams of amber, rubbery polymer were obtained. A film was pressed between Kapton polyamide film (Du Pont) at 215° C./14.06 kg./cm.$^2$. The film was stretched at 5.80 cm./min. gave 360 percent elongation at the break (175 percent permanent set) with a tensile strength of 133.6 kg./cm.$^2$. A sample which was stretched (after cold drawing) 3 times to 160 percent had 15 percent permanent set. A fiber, spun at 204° C. had a denier of 209, an elongation of 200 percent and a tenacity of 0.38 grams per denier.

A sample of the polymer was purified by grinding in a mill with dry ice and then blending for 1 hour with 300 ml. of ethanol containing 300 ml. of tetrahydrofuran, and 40 ml. of 10 percent hydrochloric acid. After washing in the blender with ethanol, the polymer was dried at 60° C./0.1 mm. Purified polymer was pressed into a clear, yellow, bubble-free film at 200° C./1054.5 kg./cm.$^2$ which had 400 percent elongation (100 percent elastic elongation) and a tensile strength of 197.75 kg./cm.$^2$.

EXAMPLE 46

Ten grams of an ethylene copolymer (similar to Procedure R) were reacted with 4 ml of the amine terminated polyethylene oxide polymer of Example 42 and by the same procedure.

Four grams of this grafted copolymer were blended with 46 g. polypropylene (Profax 6501, Hercules, Inc.) on an electrically heated two roll mill.

The solid product was melt spun into fiber. The fiber was gathered into a hank of 3500 denier and tested for resistivity. The fiber resistivity was $4.8 \times 10^9$ ohm cm. This is in contrast to a value of about $10^{17}$ ohm cm. for fiber of pure polypropylene.

EXAMPLE 47

A free radical process, as described in U.S. Pat. No. 3,689,593 was used to make a polymer of styrene (using aminoethanethiol as the chain transfer agent). The molecular weight of the polymer is about 3500 (about 34 monomer units) and about 90% of the molecules are terminated with an $NH_2$ group on one end with either a phenyl group or a methyl group on the other end.

0.5 Gram of the solid polymer described above was blended in a solution of boiling toluene with 2.5 g. of an ethylene copolymer (Procedure S). The solution was used to cast a clear film. The clarity of this film shows that grafting has taken place.

EXAMPLE 48

Six grams of copolymer similar to that of Procedure M were dissolved in hot toluene. To this were added 3 g. of a low molecular weight polystyrene similar to that of Example 47. The film was dried on the steam bath and it dried as a clear film. From the infrared spectra it was concluded that 20–25 percent of the anhydride present in the ethylene copolymer had reacted.

EXAMPLE 49

A low molecular weight polymer of methyl methacrylate was made using the process of U.S. Pat. No. 3,689,593. It was made in a 250 ml. round bottom flask into which was put 100 ml. toluene, 75 ml. of uninhibited methyl methacrylate, 0.6 g. of 2-aminoethanethiol and 0.1 g. of (Vazo 88) azodicyclohexanecarbonitrile. This was heated with vigorous stirring at 110° C. for 1 hour. Unreacted monomer and solvent was driven off. The resultant polymer represented a 41 percent conversion of the methyl methacrylate.

Five grams of the ethylene copolymer of Procedure S were dissolved in toluene. To this was added 1.75 g. of the above methyl methacrylate polymer. The solution was heated to about 100° C. for 10 minutes, dried, and melt pressed into a 0.25 mm film. The film was crystal clear, tough and moderately flexible. A control sample was made by substituting an ethylene/vinyl acetate bipolymer containing 28 percent vinyl acetate for the ethylene copolymer of Procedure S in the above blending procedure. The resultant film was slightly hazy and it exhibited very weak tear strength. This comparison shows that the low molecular weight polymethyl methacrylate of this Example is not compatible with an ethylene/vinyl acetate bipolymer and consequently that the good physical properties of this example show that a graft copolymer has been produced.

EXAMPLE 50

A low molecular weight polymer of methyl methacrylate was made by the same process as Example 49. The level of 2-aminoethanethiol was reduced to 0.4 g. and the temperature was reduced to 100° C. The initiator was 0.1 g. Vazo 64 (azobisisobutyronitrile). The resultant polymer represented a 51 percent conversion of the methyl methacrylate.

Five grams of the ethylene copolymer of Procedure S were dissolved in toluene. To this was added a toluene solution containing 5.3 g. of the above polymethyl methacrylate. The solvent was evaporated and the polymer was pressed at 190° C. into a 0.25 mm film. The film was crystal clear, showing as above that grafting had taken place.

EXAMPLE 51

A blend was made on a heated two roll mill. This blend contained 90 percent polyvinyl chloride and 10 percent of the graft copolymer of Example 50. The polyvinyl chloride used contained 2 percent Thermolite 31 as a stabilizer. The blend was molded into slabs 3.17 mm thick for testing. These were clear. The Izod Impact Strength was 5.4 kg.-cm./cm. of notch. The heat deflection temperature, ASTM D-648 (18.6 kg./cm.$^2$) was 68° C.

EXAMPLE 52

A low molecular weight polymer of methyl methacrylate was made by the same process as Example 49. The methyl methacrylate level was 47 g., the 2-aminoethanethiol was 0.5 g. and 0.05 g. of Vazo 64 (azobisisobutyronitrile) was used as catalyst. The mixture was heated to 100° C. for 1 hour. The resultant polymer represented a 36 percent conversion of the methyl methacrylate. The number average molecular weight of the polymer was about 7,000 by vapor pressure osmometry. This represents an average degree of polymerization of about 70.

EXAMPLE 53

A graft polymer was made as in Example 49. The ingredients were 2 g. of the polymer of Example 52 and 2 g. of the polymer of Procedure V. The product was cast from solution into a clear and flexible film, showing that grafting had taken place.

EXAMPLE 54

A blend was made on a two roll mill. This blend contained 85 percent of polyvinyl chloride and 15 percent of the graft copolymer of Example 53. The Izod Impact Strength was 13 kg.-cm./cm. of notch. The value in the Variable Height Impact Test was 122 kg.-cm./mm of thickness (0.76 mm sheet).

EXAMPLE 55

A low molecular weight polymer was made as in Example 49. The ingredients were 47 g. of methyl methacrylate, 0.4 g. of 2-aminoethanethiol and 0.04 g. of Vazo 64. The resultant polymer represented a 33 percent conversion of the methyl methacrylate. The number average molecular weight was 5500 by vapor pressure osmometry.

EXAMPLE 56

A graft copolymer was made as in Example 49. The ingredients were 2.4 g. of the polymer of Example 55 and 3.7 g. of a polymer containing 32 percent vinyl acetate and 2.6 percent maleic anhydride. The film was clear and rubbery. The infrared spectrum showed that essentially all of the anhydride groups were reacted.

EXAMPLE 57

A blend was made as in Example 51. The components were 85 percent polyvinyl chloride and 15 percent of Example 56. The flexural modulus of this blend was 23,902 kg./sq. cm.; the Izod Impact Strength 12 kg.-cm./cm of notch; the Variable Height Impact Test value 122 kg.-cm./mm and the Heat Deflection Temperature, 69° C.

EXAMPLE 58

Five grams of an ethylene copolymer containing maleic anhydride, Procedure Q, were dissolved in toluene. To this solution were added 2 g. of a polypropylene oxide substantially all of the chains of which have an alkyl group of 3 carbon atoms on one end and a primary amine on the other end. (Supplied by Jefferson Chemical Company as Jeffamine 4419—69; molecular weight approximately 600). The solvent was removed by heating over a steam bath. A film of this product cast from solution was clear, indicating that grafting had taken place.

EXAMPLE 59

One gram of the ethylene copolymer of Procedure S was dissolved in hot hexamethyl phosphoramide, one-half g. of a low molecular weight polycaprolactam of Procedure GG was also dissolved in hot hexamethyl phosphoramide. The two solutions were mixed and kept hot for about 5 minutes. The polymer was precipitated in pentane, filtered, washed with pentane and dried. The melt pressed film from this polymer was clear. The infrared spectrum showed that about 50 percent of the anhydride groups of the ethylene copolymer had reacted.

One gram of the above half-grafted copolymer was redissolved in hot hexamethyl phosphoramide. To this solution was added one-half g. of the short chain polyethylene oxide of Example 42. This was again held hot for about 5 minutes, precipitated, filtered, washed and dried. The infrared scan showed that all of the anhydride was reacted by the absence of the infrared band at 5.4 microns.

In this example, there has been produced a graft copolymer in which the main chain is an ethylene/vinyl acetate/maleic anhydride copolymer, and which has two types of side chains; one is a polyamide chain, the other is a chain of polyethylene oxide units.

EXAMPLE 60

Hot toluene was used as the reaction medium in which a short chain of polymethyl methacrylate units similar to the product in Example 49 were grafted to the ethylene copolymer of Procedure S. The dried sample was pressed into a clear film. The infrared spectrum showed that about 10 percent of the anhydride groups had reacted.

0.75 Gram of this graft copolymer was redissolved in toluene. To this was added 0.25 g. of the short chain polyethylene oxide material of Example 42. This solution was kept hot for 5 minutes and then dried. The pressed film was clear, and the infrared spectrum showed complete reaction of the anhydride.

In this example, there has been produced a graft copolymer in which the main chain is an ethylene/vinyl acetate copolymer/maleic anhydride, and which has two types of side chains, one is a polymethyl methacrylate chain, the other is a polyethylene oxide chain.

EXAMPLE 61

In a manner similar to the procedure in Example 60, 0.5 g. of a short chain polystyrene similar to that described in Example 47 was grafted to 1 g. of the ethylene copolymer of Procedure S. To 0.75 g. of this partially grafted copolymer was grafted 0.25 g. of the polyethylene oxide of Example 42.

In this example there has been made a graft copolymer in which the main chain is an ethylene/vinyl acetate/maleic anhydride copolymer, some of the side chains are polystyrene and others are polyethylene oxide chains.

EXAMPLE 62

In a manner similar to the procedure of Example 60, 2 g. of the polymethyl methacrylate resin of Example 49 was reacted with 1 g. of the ethylene copolymer of Procedure S. The infrared spectrum of this copolymer showed that about 40 percent of the anhydride had reacted.

To 1½ g. of this partially grafted copolymer was grafted 1 g. of the short chain polystyrene resin similar to that described in Example 47. The film pressed from this graft copolymer was clear. The infrared spectrum showed that about 90 percent of the anhydride graft sites had reacted.

In this example there was made a graft copolymer in which about 50 percent of the total number of side chains are polymethyl methacrylate chains and about 50 percent of the total number of side chains are polystyrene side chains.

EXAMPLE 63

An ethylene copolymer was synthesized and was shown by analysis to have 23 percent vinyl acetate and 9 percent methyl hydrogen maleate (the half methyl ester of maleic acid).

A toluene solution was made of 1.5 g. of this copolymer and 1 g. of an amine terminated polyethylene oxide of about 1000 molecular weight. This is similar to the polyethylene oxide of Example 42. This solution was heated for about 15 minutes and then heat treated on a steam bath to drive off the solvent. The infrared spectrum showed that grafting had taken place.

EXAMPLE 64

A styrene copolymer containing 17 percent by weight copolymerized maleic anhydride was obtained from Monsanto (Lyntron 820). Two grams of this copolymer were reacted in solution the solvent being toluene/tetrahydrofuran (90/10) with 3.6 g. of the amine-terminated polyethylene oxide (molecular weight 1000) of Example 63. The dried blend is perfectly clear, indicating that grafting has taken place.

EXAMPLE 65

Two grams of the styrene-maleic anhydride copolymer of Example 64 were reacted in solution as described in that Example with 2.2 g. of the amine-terminated polypropylene oxide (mol. wt. 600) of Example 60. The dried blend is perfectly clear, indicating that grafting has taken place.

[EXAMPLE 66]

[One gram of the styrene/maleic anhydride copolymer of Example 64 was reacted in solution the solvent being hexamethylphosphoramide with an amine-terminated polycaprolactam oligomer of mol. wt. 1140 (Procedure DD). The resultant polymer gave a clear film indicating that grafting has taken place.]

[(Ethylene/Maleic Anhydride)/Caprolactam Graft Copolymer]

[A. Solution Procedure]

[EXAMPLE 67]

[A solution of 10 g. of 95.8/4.2 ethylene/maleic anhydride (E/MAnh) copolymer (MI=15) in 125 ml. toluene and 25 ml. hexamethylphosphoramide (HMP) was mixed with a solution of 3.7 g. of caprolactam (CL)/hexylamine (HA) oligomer (DP=7; Table VIII, Procedure FFF in 100 ml. of dry HMP at 105° C. and the mixture was stirred and heated at 100°-110° C. for 1 hr. The reaction mixture was then partially cooled and the polymeric product precipitated and isolated by adding successively two 15-ml. portions of methanol, the mixture was cooled to room temperature and diluted with 300 ml. of methanol to precipitate the graft copolymer. The polymer was isolated by filtration and then washed successively in a blender twice with methanol, twice with water, and then twice with methanol. The vacuum-dried product (11.2 g.) showed DSC melting endotherms at 106° (olefin peak) and 187° (amide peak), and was molded into a 0.13 mm film which was clear, transparent and flexible, indicating that an (E/MAnh)/CL graft copolymer had been formed. The film had a tensile strength (T) of 143 kg./cm.$^2$, an elongation (E) of 280 percent and a modulus (M) of 1930 kg./cm.$^2$, and molded bars gave flexural modulus (FM) kg./cm.$^2$ of 2600 at 25°, 1270 at 60° and 548 at 100°. Nitrogen analysis indicated a CL/HA content of 21 percent by weight.]

[The above procedure was repeated with 10 g. of the 95.8/4.2 E/MAnh copolymer (MI=15) and 7.3 g. of the CL/HA oligomer (DP=15) of Table VIII, Procedure BBB. The resulting (E/MAnh)/CL graft copolymer analyzed for 40 percent CL/HA; had DSC melting endotherms at 106° and 207°; in 0.13 mm film showed T=178 kg./cm.$^2$. E=87 percent and M=4060 kg./cm.$^2$, and molded bars gave flexural modulus kg./cm.$^2$ values of 6190 at 25°, 2390 at 60° and 1400 at 100° C.]

[B. Roll Mill Procedure (Melt Reaction)]

[EXAMPLE 68]

[A 40-g. sample of 95.8/4.2 E/MAnh copolymer (MI=15) was worked under a stream of nitrogen on a 2-roll mill with electrically heated 76.2 mm rolls heated to 205° until the copolymer was molten. Finely divided CL/HA oligomer (9.7 g.; DP=10; prepared as in Table VIII, Procedure DDD) was sprinkled into the molten polymer and milling continued for about 6 minutes. The milled product (48 g.) was then removed and cooled. Analysis showed a CL/HA content of 19 percent by weight. It formed pressed 0.13 mm films at 240°-260° which were clear, transparent, pliable and creasable, and which showed presence of amide and anhydride structure by infrared spectroscopy. Film tests showed T of 135 kg./cm.$^2$, E of 306 percent and M of 2180 kg./cm.$^2$.]

[The above procedure was repeated with the same E/MAnh copolymer, various CL/HA oligomers and different mill temperatures. All of the products gave clear, transparent films, indicating positive formation of grafted (E/MAnh)/(CL/HA) copolymer. The data are presented in Table XVI.]

[TABLE XVI

Milled (Ethylene/Maleic Anhydride)/Caprolactam Graft Copolymers

| Ex. 68 | E/MAnh (g) | CL/HA Oligomer (I-Ex.)[a] | (g) | (DP) | Temp. (°C.) | CL/HA[b] (%) | T kg/cm$^2$ | E % | M kg./cm.$^2$ | FM kg./cm.$^2$ 25[a] | DSC peaks. (°C.) |
|---|---|---|---|---|---|---|---|---|---|---|---|
| A | 40.0 | AAA | 8.0 | 7 | 190 | 16(17) | — | — | — | 2250 | 107.108 |
| B[c] | 30.0 | AAA | 11.1 | 7 | 210-215 | 25(27) | 146 | 230 | 2240 | 2460 | 108.185 |
| C | 30.0 | BBB | 22.0 | 15 | 220-225 | 40(42) | 173 | 73 | 4290 | 4430 | 109.207 |
| D[c] | 30.0 | — | 29.1 | 20 | 225-230 | (49) | 214 | 116 | 4150 | 5690 | — |
| E[c] | 30.0 | — | 29.1 | 20 | 240 | (49) | 190 | 75 | 4400 | 6260 | — |
| F[c] | 30.0 | — | 9.8 | 5.8 | 190-200 | (25) | 155 | 360 | 2080 | 2390 | — |

[a]From Table VIII.
[b]Based on % N in milled product. Values in ( ) are from quantities charged.
[c]Base polymer and oligomer premixed before placing on mill.]

[C. Extrusion Procedure (Melt Reaction)]

[EXAMPLE 69]

[A 65/35 mixture of 93.8/6.2 E/MAnh copolymer (MI=5.1) and CL/HA oligomer (DP=7; Table VIII, Procedure AAA) was put through a twin screw mixing extruder at 225°, the throughput time being about 4 minutes. The extrudate was a clear melt, indicating that the grafting reaction had gone well in a single pass. The product showed a flexural modulus of 2030 kg./cm.$^2$. Torsion modulus values (dynes/cm$^2$×10$^{-9}$) at various temperatures were as follows: 12.4 at −180°; 8.0 at −100°; 5.1 at −50°; 2.3 at 0°; 1.37 at 20°; 0.61 at 50°; 0.16 at 100°; 0.08 at 150°.]

[The above procedure was used to prepare additional (E/MAnh)/CL graft copolymers, the data being presented in Table XVII.]

[TABLE XVII

Extruded (Ethylene/Maleic Anhydride)/Caprolactam Graft Copolymers

| Ex. 69 | MI | E/MAnh MAnh[a] (%) | E/MAnh[b] (%) | OL/HA Oligomer Proc. | (DP) | (%)[b] | Flex. Mod. (kg./cm.$^2$) | Torsion Modulus, dynes/cm$^2$ × 10$^{-9}$ −180 °C. | −100 °C. | −50 °C. | 0 °C. | 20 °C. | 50 °C. | 100 °C. | 150 °C. |
|---|---|---|---|---|---|---|---|---|---|---|---|---|---|---|---|
| A | 126 | 9.8 | 54 | AAA | 7 | 46 | 2810 | 12.0 | 8.1 | 6.0 | 3.0 | 2.1 | 0.88 | 0.34 | 0.21 |
| B | 5.7 | 5.9 | 44 | — | 18 | 56 | — | 15.5 | 9.5 | 7.4 | 5.0 | 4.0 | 2.8 | 0.70 | 0.40 |
| C | 136 | 9.4 | 34 | — | 18 | 66 | — | 16.0 | 9.1 | 7.1 | 5.0 | 4.0 | 2.6 | 0.72 | 0.38 |

[a]Percent MAnh in the substrate E/MAnh copolymer.
[b]Percent of reactant in the extrusion mixture.]

[EXAMPLE 70]

[(Ethylene/Ethyl Maleate)/Caprolactam Graft Copolymer]

[A mixture of 18 g. of 91/9 ethylene/monoethyl ester of maleic acid (E/MAME) copolymer and 5.1 g. of CL/HA oligomer (DP=6.7) was milled on a two roll mill as in Example 68. The resulting (E/MAME)/CL graft copolymer could be rolled out in a cold mill to form a flexible sheet. It analyzed for a CL/HA content of 22 percent. Torsion modulus values (dynes/cm.$^2 \times 10^{-9}$) at various temperatures: 11.9 at −180°; 9.4 at −100°; 8.2 at −50°; 5.2 at 0°; 3.8 at 20°; 2.6 at 50°; 0.90 at 100°; 0.14 at 150°.]

[EXAMPLE 71]

[(Ethylen/Butyl Itaconate)/Caprolactam Graft Copolymer]

[Following generally the solution procedure of Example 67,7 g. of 88.3/11.7 ethylene/monobutyl ester of itaconic acid (E/BuIt) copolymer was dissolved in 100 ml. of toluene at 100°-115°, 25 ml. of HMP was added, and then a solution of 3.7 g. of CL/HA oligomer (DP=6.7) in 75 ml. of HMP was added in one portion with vigorous stirring. Stirring and heating was continued for 1.25 hours, and the graft copolymer was then precipitated and isolated through addition of 400 ml. of methanol. The product (8.2 g.) analyzed for a CL/HA content of 23 percent by weight. Films pressed at 235°-240° were clear, transparent and flexible.]

[(Ethylene/Maleic Anhydride)/Laurolactam Graft Copolymer]

[EXAMPLE 72]

[Following the solution procedure of Example 67, a series of (E/MAnh)/LL graft copolymers was prepared. The data are given in Table XVIII.]

[The trunk copolymer of the graft copolymer averages only about 3 amine-active sites per chain. The chain length of side chain polymer averages about two-thirds the length of the trunk copolymer. On the average three side chain polymers are attached to the trunk copolymer.]

We claim:

[1. Process for the preparation of thermoplastic graft copolymers which comprises heating for about 15 seconds to 60 minutes, with mixing, (1) a trunk copolymer of at least two monomers, at least one of said monomers providing amine-reactive sites taken from the group consisting of an anhydride group, a vicinal pair of carboxylic groups and a carboxylic group adjacent to an alkoxycarbonyl group, wherein the alkoxy group contains up to 20 carbon atoms, and at least one of said monomers containing no aminereactive sites, and (2) at least one side chain polymer ranging in length from about 25 to 1000 chain atoms, having per chain one active amine site taken from the group consisting of primary and secondary amines, the remainder of said side chain polymer being substantially unreactive with the reactive sites of the trunk copolymer.]

[2. A process according to claim 1 wherein the active amine site of the side chain polymer is a primary amine.]

3. A process according to claim [1] *68* wherein the process is conducted in the melt.

4. A process according to claim [1] *68* wherein the process is conducted in solution.

5. A process according to claim [1] *68* wherein the heating temperature is above the melting points of the trunk copolymer and side chain polymer.

6. A process according to claim [1] *68* wherein the heating is conducted for about 15 seconds to 10 minutes.

7. A process according to claim [1] *68* wherein the trunk copolymer is derived from an α-olefin and at least one monomer providing amine-reactive sites taken from the group consisting of an anhydride, diacid and half-esters derived therefrom.

8. A process according to claim 7 wherein the α-olefin is ethylene.

9. A process according to claim 8 wherein there is present at least one additional polymerizable monomer which contains no amine-reactive sites and no anhydride reactive sites.

10. A process according to claim 9 wherein the additional polymerizable monomer is 3-methylbutene.

11. A process according to claim 9 wherein the additional polymerizable monomer is vinyl acetate.

12. A process according to claim 9 wherein the additional polymerizable monomer is methyl acrylate.

13. A process according to claim 9 wherein the additional polymerizable monomer is methyl methacrylate.

[14. A process according to claim 1 wherein the trunk copolymer is derived from styrene and at least

[TABLE XVIII

| | (E/MAnh)/LL Graft Copolymers | | | | | | | | | |
|---|---|---|---|---|---|---|---|---|---|---|
| | Base Polymer | | | LL/HA Oligomer | | | | Graft Copolymer | | |
| Ex. 72 | Manh (%) | MI | (g) | (Proc.) | (DP) | (g) | Yield (g) | LL/HA (%) | DSC Mp (°C.) | FM (kg./cm.$^2$) |
| A | 9.8 | 174 | 7.0 | MMM | 6.5 | 9.6 | 14.8 | — | 160 | — |
| B | 6.2 | 5 | 10.0 | MMM | 6.5 | 8.7 | 17.1 | — | 160 | — |
| C | 4.2 | 15 | 10.0 | NNN | 7.2 | 6.54 | 14.9 | 39 | 163-5 | — |
| D | 3.0 | 40 | 10.0 | NNN | 7.2 | 4.55 | 13.0 | 31 | — | — |
| E | 3.0 | 40 | 10.0 | — | 6.4 | 2.5 | 10.7 | 18 | 160 | 2900 |
| F | 3.0 | 40 | 10.0 | — | 6.4 | 1.5 | 10.2 | 14 | 159 | 3070] |

[EXAMPLE 73]

[An ethylene/maleic anhydride trunk copolymer was prepared which contained 86.5 weight percent ethylene and 13.5 weight percent maleic anhydride. The copolymer was pumped by an extruder through a tube heated to about 500° C. to reduce the molecular weight. The melt viscosity was 600 centipoises at 140° C. The average chain length was about 300 carbon atoms.]

[One gram of the trunk copolymer was reacted with 2 g. of the amine-terminated caprolactam/laurolactam oligomer of Procedure OO in hot hexamethylphosphoramide. The solution was kept hot for about 5 minutes and then poured into rapidly stirred cold pentane to precipitate the polymer. It was then filtered and washed with acetone to remove excess solvent and dried.]

one monomer providing amine-reactive sites taken from the group consisting of an anhydride, diacid and half-esters derived therefrom.]

[15. A process according to claim 14 wherein there is present at least one additional polymerizable monomer containing no amine-reactive sites and no anhydride reactive sites.]

16. A process according to claim 7 wherein the monomer providing amine-reactive sites is maleic anhydride wherein the maleic anhydride is present in an amount of 1.0 to 25.0 parts by weight.

17. A process according to claim [14] *68* wherein the monomer providing amine-reactive sites is maleic anhydride wherein the maleic anhydride is present in an amount of 1.0 to 30.0 parts by weight.

18. A process according to claim 9 wherein the trunk copolymer is composed of ethylene, monoalkyl maleate, whrein alkyl is in the range of 1 to 4 carbon atoms, in addition to an additional polymerizable monomer.

19. A process according to claim 9 wherein the trunk copolymer is composed of ethylene, monalkyl fumarate wherein alkyl is in the range of 1 to 4 carbon atoms, in addition to an additional polymerizable monomer.

20. A process according to claim 9 wherein the trunk copolymer is composed of ethylene, monoalkyl itaconate wherein alkyl is in the range of 1 to 4 carbon atoms, in addition to an additional polymerizable monomer.

[21. A process according to claim 1 wherein the side chain polymer is selected from the group consisting of polymers of lactams containing 3 to 12 carbon atoms, copolymers of lactams containing 3 to 12 carbon atoms, polymers of organic oxides containing 2 to 16 carbon atoms, copolymers of organic oxides containing 2 to 16 carbon atoms, polymers of styrene, polymers of substituted styrenes, copolymers of styrene and substituted styrene, polymers of acrylates, polymers of methacrylates, copolymers of acrylates and methacrylates, and polymers of lactones.]

[22. A process according to claim 21 wherein a side chain polymer present is a polycaprolactam.]

[23. A process according to claim 21 wherein a side chain polymer present is a polylaurolactam.]

[24. A process according to claim 21 wherein a side chain polymer present is a copolymer of caprolactam and laurolactam.]

25. A process according to claim [21] *68* wherein a side chain polymer present is polyethylene oxide.

26. A process according to claim [21] *68* wherein a side chain polymer present is polypropylene oxide.

27. A process according to claim [21] *68* wherein a side chain polymer present is polystyrene.

28. A process according to claim [21] *70* wherein the side chain polymers are short chains having repeat units from about 5 to 50 in which at least 80 percent of the side chain polymers have one active amine site and the remainder of said side chain polymer is substantially unreactive with the amine-reactive sites on the trunk copolymer.

29. A process according to claim 28 wherein the side chain polymers contain substituent alkyl groups of 1 to 18 carbon atoms.

30. A process according to claim [28] *68* wherein the side chain polymers contain substituent aryl groups.

31. A process according to claim [1] *68* wherein the trunk copolymers contain, on the average, about 300 to 50,000 chain atoms and the number of reactive sites occur, on the average, at a frequency of 1 to 50 sites per thousand chain atoms of the main chain.

32. A process according to claim [31] *68* wherein trunk copolymers contain, on the average, about 500 to 2,000 chain atoms of the main chain.

33. A process according to claim [31] *68* wherein the side chain polymer reactive with the amine-reactive sites on the trunk copolymer range in length from 25 to 1,000 chain atoms.

[34. A thermoplastic graft copolymer consisting essentially of a trunk copolymer derived from at least two monomers, at least one of said monomers providing amine-reactive sites selected from the group consisting of an anhydride group, a vicinal pair of carboxylic groups and a carboxylic group adjacent to an alkoxycarbonyl group, wherein the alkoxy group contains up to 20 carbon atoms, and at least one of said monomers containing no amine-reactive sites; and at least one type side chain polymer linked to said reactive sites through amide or imide linkages, said side chain polymer being derived from a short chain polymer having from about 5 to 50 repeat units and containing one active amine site selected from the group consisting of primary and secondary amines, the remainder of the side chain polymer being substantially unreactive with the amine-reactive sites of the trunk copolymer with the proviso that when only one type of side chain polymer is present the side chain polymer contains only one nitrogen atom, said atom being found in the active amine site.]

[35. A graft copolymer according to claim 34 wherein the trunk copolymer and side chain polymers are linked through imide linkages.]

36. A graft copolymer according to claim [34] *69* wherein solely one type of side chain polymer is linked to the trunk copolymer, said side chain polymer being selected from the group consisting of polymers of organic oxides containing 2 to 16 carbon atoms, copolymers of organic oxides containing 2 to 16 carbon atoms, polymers of styrene, polymers of substituted styrenes, copolymers of styrene and substituted styrene, polymers of acrylates, polymers of methacrylates, copolymers of acrylates and methacrylates, and polymers of lactones.

37. A graft copolymer according to claim 36 wherein the side chain polymer is polyethylene oxide.

38. A graft copolymer according to claim 36 wherein the side chain polymer is polypropylene oxide.

39. A graft copolymer according to claim 36 wherein the side chain polymer is a polymethacrylate.

40. A graft copolymer according to claim 36 wherein the side chain polymer is a polyacrylate.

41. A graft copolymer according to claim 36 wherein the side chain polymer is polystyrene.

42. A graft copolymer according to claim [34] *69* wherein at least two different type side chain polymers are present.

[43. A graft copolymer according to claim 42 wherein the side chain polymers are selected from the group consisting of polymers of lactams containing 3 to 12 carbon atoms, copolymers of lactams containing 3 to 12 carbon atoms, polymers of organic oxides containing 2 to 16 carbon atoms, copolymers of organic oxides containing 2 to 16 carbon atoms, polymers of styrene, polymers of substituted styrenes, copolymers of styrene and substituted styrene, polymers of acrylates, polymers of methacrylates, copolymers of acrylates and methacrylates, and polymers of lactones.]

44. A graft copolymer according to claim [43] *71* wherein the side chain polymers are polyethylene oxide and polycaprolactam.

45. A graft copolymer according to claim [43] *69* wherein the side chain polymers are polyethylene oxide and polymethyl methacrylate.

46. A graft copolymer according to claim [43] *69* wherein the side chain polymers are polystyrene and polyethylene oxide.

47. A graft copolymer according to claim [43] *69* wherein the side chain polymers are polystyrene and polymethyl methacrylate.

48. A graft copolymer according to claim [34] *69* wherein the trunk copolymer is derived from ethylene and at least one monomer providing amine-reactive sites taken from the group consisting of an anhydride, diacid and half-esters derived therefrom.

49. A graft copolymer according to claim 48 wherein there is present at least one additional polymerizable monomer which contains no amine-reactive sites and no anhydride reactive sites.

50. A graft copolymer according to claim 48 wherein the side chain is polyethylene oxide.

51. A graft copolymer according to claim 48 wherein the side chain is a polymer selected from the group consisting of polyacrylate, polymethacrylate or copolymers thereof.

52. A graft copolymer according to claim 48 wherein the monomer providing amine-reactive sites is maleic anhydride wherein the maleic anhydride is present in an amount of 1.0 to 25 parts by weight.

53. A graft copolymer according to claim [34] *69* wherein the trunk copolymer is derived from styrene and at least one monomer providing amine-reactive sites taken from the group consisting of an anhydride, diacid and half-esters derived therefrom.

54. A graft copolymer according to claim 53 wherein there is present at least one additional polymerizable monomer containing no amine-reactive sites and no anhydride reactive sites.

55. A graft copolymer according to claim 53 wherein the monomer providing amine-reactive sites is maleic anhydride wherein the maleic anhydride is present in an amount of 1.0 to 30 parts by weight.

56. A graft copolymer according to claim 49 wherein the trunk copolymer is composed of ethylene, monoalkyl maleate, wherein alkyl is in the range of 1 to 4 carbon atoms, in addition to an additional polymerizable monomer.

57. A graft copolymer according to claim 49 wherein the trunk copolymer is composed of ethylene, monoalkyl fumarate wherein alkyl is in the range of 1 to 4 carbon atoms, in addition to an additional polymerizable monomer.

58. A graft copolymer according to claim 49 wherein the trunk copolymer is composed of ethylene, monoalkyl itaconate wherein alkyl is in the range of 1 to 4 carbon atoms, in addition to an additional polymerizable monomer.

59. A graft copolymer according to claim [34] *69* wherein the trunk copolymer contains, on a number average, about 300 to 50,000 chain atoms and the number of reactive sites occur, on the average, at a frequency of about 1 to 200 reactive sites per thousand chain atoms of the trunk copolymer, there being on the average at least about one active site per trunk copolymer chain.

60. A graft copolymer according to claim 59 wherein the trunk copolymer contains, on the average, about 500 to 2,000 chain atoms.

61. A graft copolymer according to claim 59 wherein any side chain polymer reactive with the amine-reactive sites on the trunk copolymer range in length from 25 to 1,000 chain atoms.

[62. A process according to claim 1 wherein the side chain polymer has an average degree of polymerization of 5 to 60.]

[63. A process according to claim 62 wherein the average degree of polymerization of the side chain polymer is 6 to 8.]

[*64. A graft copolymer according to claim 34 wherein the side chain polymer has an average degree of polymerization of* 5 to 60.]

[65. A graft copolymer according to claim 64 wherein the average degree of polymerization of the side chain polymer is 6 to 8.]

66. A graft copolymer according to claim [64] *70* wherein the non-reactive end of the side chain polymer has substituent alkyl groups of 1 to 18 carbon atoms.

67. A graft copolymer according to claim [64] *70* wherein the non-reactive end of the side chain polymer has substituent aryl groups.

*68. Process for the preparation of graft copolymers which comprises heating for about 15 seconds to 60 minutes, with mixing, (1) a trunk copolymer of at least two monomers at least one of said monomers providing amine-reactive sites taken from the group consisting of an anhydride, a vicinal pair of carboxylic groups, and a carboxylic group adjacent to an alkoxycarbonyl group, where the alkoxy group contains up to 20 carbon atoms, and at least one of said monomers contains no amine-reactive sites, and (2) at least one side chain polymer ranging in length from about 25 to 1,000 chain atoms having per chain one active amine site taken from the group consisting of primary and secondary amines, the remainder of said side chain polymer being selected from the group consisting of polymeric organic oxides containing 2 to 16 carbon atoms, copolymers of organic oxides containing 2 to 16 carbon atoms, polymers of styrene, polymers of substituted styrenes, copolymers of styrene and substituted styrene, polymers of acrylates, polymers of methacrylates, copolymers of acrylates and methacrylates, and polymers of lactones.*

*69. A thermoplastic graft copolymer consisting essentially of a trunk copolymer derived from at least two monomers, at least one of said monomers providing amine-reactive sites selected from the group consisting of an anhydride group, a vicinal pair of carboxylic groups, and a carboxylic group adjacent to an alkoxycarbonyl group, where the alkoxy group contains up to 20 carbon atoms, and at least one of said monomers contains no amine-reactive sites; and at least one type side chain polymer linked to said reactive sites through amide or imide linkages, said side chain polymer being derived from a short chain polymer having about 5 to 50 repeating units and containing one active amine site selected from the group consisting of primary and secondary amines, the remainder of the side chain polymer being selected from the group consisting of polymeric organic oxides containing 2 to 16 carbon atoms, copolymers of organic oxides containing 2 to 16 carbon atoms, polymers of styrene, polymers of substituted styrenes, copolymers of styrene and substituted styrene, polymers of acrylates, polymers of methacrylates, copolymers of acrylates and methacrylates, and polymers of lactones.*

*70. Process for the preparation of graft copolymers which comprises heating for about 15 seconds to 60 minutes, with mixing, (1) a trunk copolymer of at least two monomers, at least one of said monomers providing amine-reactive sites taken from the group consisting of an anhydride, a vicinal*

*pair of carboxylic groups, and a carboxylic group adjacent to an alkoxycarbonyl group, where the alkoxy group contains up to 20 carbon atoms, and at least one of said monomers contains no amine-reactive sites, and (2) two types of side chain polymers ranging in length from about 25 to 1000 chain atoms, having per chain one active amine site taken from the group consisting of primary and secondary amines,*

*said polymers being selected from the group consisting of the following pairs: polycarpolactam and polyethylene oxide, polymethyl methacrylate and polyethylene oxide, polystyrene and polyethylene oxide, and polymethyl methacrylate and polystyrene.*

*71. A thermoplastic graft copolymer consisting essentially of (1) a trunk copolymer derived from at least two monomers, at least one of said monomers providing amine-reactive sites, selected from the group consisting of an anhydride group, a vicinal pair of carboxylic groups, and a carboxylic group adjacent to an alkoxycarbonyl group where the alkoxy group contains up to 20 carbon atoms, and at least one of said monomers contains no amine-reactive sites; and (2) two types of side chain polymers linked to said reactive sites through amide or imide linkages, said side chain polymers being derived from a short chain polymer having about 5 to 50 repeating units and containing one active amine site selected from the group consisting of primary and secondary amines,*

*which amines form said amide or imide linkages with the amine-reactive sites of the trunk copolymer, said side chain polymers being selected from the group consisting of the following pairs: polycaprolactam and polyethylene oxide, polymethyl methacrylate and polyethylene oxide, polystyrene and polyethylene oxide, and polymethyl methacrylate and polystyrene.*

* * * * *

Dedication

Re. 30,754.—*Clarence F. Hammer*, Wilmington, Del. and *Harold K. Sinclair*, Louisville, Ky. PROCESS FOR THE PREPARATION OF GRAFT COPOLYMERS. Patent dated Sept. 29, 1981. Dedication filed May 6, 1986, by the assignee, *E. I. du Pont de Nemours and Co.*

Hereby dedicates to the public the entire remaining term of said patent.
[*Official Gazette July 1, 1986.*]